United States Patent
Owen et al.

(10) Patent No.: US 11,327,746 B2
(45) Date of Patent: May 10, 2022

(54) REDUCED PROCESSING LOADS VIA SELECTIVE VALIDATION SPECIFICATIONS

(71) Applicant: Microsoft Technology Licensing, LLC, Redmond, WA (US)

(72) Inventors: Nathan Cole Owen, Seattle, WA (US); Carlo Rivera, Twp of Washington, NJ (US); Ryan Patrick Heaney, Seattle, WA (US); Adrian Roy Padua, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/911,251

(22) Filed: Jun. 24, 2020

(65) Prior Publication Data
US 2021/0406000 A1 Dec. 30, 2021

(51) Int. Cl.
*G06F 8/71* (2018.01)
*G06F 11/36* (2006.01)
*G06F 8/41* (2018.01)

(52) U.S. Cl.
CPC .......... *G06F 8/71* (2013.01); *G06F 8/41* (2013.01); *G06F 11/3688* (2013.01); *G06F 11/3692* (2013.01)

(58) Field of Classification Search
USPC ....................................... 717/122
See application file for complete search history.

(56) References Cited

U.S. PATENT DOCUMENTS

| 5,649,200 A | 7/1997 | Jabs et al. |
| 7,590,669 B2 | 9/2009 | Yip et al. |
| 7,661,028 B2 | 2/2010 | Erofeev |

(Continued)

OTHER PUBLICATIONS

"GIT-Merge-Base Documentation", Retrieved From: https://git-scm.com/docs/git-merge-base, Retrieved on Dec. 31, 2020, 8 Pages.

(Continued)

*Primary Examiner* — John Q Chavis
(74) *Attorney, Agent, or Firm* — Schwegman Lundberg & Woessner, P.A.

(57) ABSTRACT

Disclosed are embodiments for reducing processing requirements in complex build environments. Complex build environments frequently perform multiple builds per day, in some cases, multiple builds are occurring in parallel. Some of these builds and some fail. Moreover, a definition of success or failure of a build can vary across individual engineers or teams of engineers. In a complex build environment that is rapidly generating multiple build results simultaneously, identifying which builds are appropriate for use can be difficult. Many teams solve this problem by increasing a frequency of builds to rapidly detect any problems with documents recently checked into a document repository. However, this relatively high frequency of builds can impose large processing and/or cost burdens on an organization. By providing sophisticated methods of extracting validation information from existing builds, the disclosed embodiments reduce processing requirements and improved efficiency of enterprise build environments.

18 Claims, 11 Drawing Sheets

(56) References Cited

U.S. PATENT DOCUMENTS

| | | | | |
|---|---|---|---|---|
| 8,381,176 | B1* | 2/2013 | Bentley | G06F 8/71 |
| | | | | 717/107 |
| 9,355,016 | B2* | 5/2016 | Baril | G06F 11/3676 |
| 9,921,948 | B2 | 3/2018 | Zieder et al. | |
| 2008/0276260 | A1* | 11/2008 | Garlick | G06F 11/3688 |
| | | | | 719/328 |
| 2014/0157245 | A1* | 6/2014 | Krueger | G06F 8/70 |
| | | | | 717/140 |
| 2014/0372983 | A1* | 12/2014 | Presley | G06F 8/71 |
| | | | | 717/124 |
| 2018/0081794 | A1 | 3/2018 | Ramdas | |
| 2019/0073230 | A1* | 3/2019 | Ruder | G06F 8/71 |
| 2020/0104120 | A1* | 4/2020 | Speer | G06F 11/3688 |

OTHER PUBLICATIONS

"View and Manage Pull Requests", Retrieved From: https://docs.microsoft.com/en-us/azure/devops/repos/git/pull-requests?view=azure-devops, Aug. 28, 2020, 30 Pages.

Oakley, et al., "Git", Retrieved From: https://github.com/git/git/blob/master/Documentation/howto/revert-a-faulty-merge.txt, Dec. 19, 2008, 6 Pages.

"Version Control", Retrieved From: https://en.wikipedia.org/wiki/Version_control, Retrieved on Dec. 31, 2020, 10 Pages.

"Merge (Version Control)", Retrieved From: https://en.wikipedia.org/wiki/Merge_(version_control), Retrieved on Dec. 31, 2020, 4 Pages.

"Git", Retrieved from: https://web.archive.org/web/20200418073942/https:/en.wikipedia.org/wiki/Git, Apr. 18, 2020, 20 Pages.

"Source Code Control System", Retrieved from: https://web.archive.org/web/20200310021638/https:/en.wikipedia.org/wiki/Source_Code_Control_System, Mar. 10, 2020, 9 Pages.

Danielson, et al., "Choosing the right version control for your project", Retrieved from: https://docs.microsoft.com/en-us/azure/devops/repos/tfvc/comparison-git-tfvc?view=azure-devops, May 12, 2017, 8 Pages.

Danielson, et al., "Review code with pull requests", Retrieved from: https://docs.microsoft.com/en-us/azure/devops/repos/git/pull-requests?view=azure-devops, Nov. 15, 2019, 47 Pages.

Danielson, et al., "Use labels to take a snapshot of your files", Retrieved from: https://docs.microsoft.com/en-us/azure/devops/repos/tfvc/use-labels-take-snapshot-your-files?view=azure-devops, Aug. 10, 2016, 11 Pages.

"International Search Report and Written Opinion issued in PCT Application No. PCT/US21/026499", dated Jul. 21, 2021, 11 Pages.

Storm, Tijs Van Der, "Backtracking Incremental Continuous Integration", In Proceedings of the 12th European Conference on Software Maintenance and Reengineering, Apr. 1, 2008, pp. 233-242.

* cited by examiner

REDUCED PROCESSING LOADS VIA SELECTIVE VALIDATION SPECIFICATIONS

BACKGROUND

Version control systems are widely employed in a variety of activities, including software development. In the software development context, a version control system is frequently used as a source for documents that are further processed to generated additional artifacts, such as executable files. These executable files are then, in some embodiments, run through a variety of automated tests, including one or more of unit tests, integration tests, or system tests. In a large development environment, documents are sometimes processed frequently to identify any problems as soon as possible after problematic source files have been submitted to the version control system. Unfortunately, this frequent processing can consume a relatively large amount of processing resources, which may not be available, or cost effective in all environments. Thus, additional improvements with respect to enterprise document version control systems are needed.

BRIEF DESCRIPTION OF THE FIGURES

FIG. 2A is an example structure of a validation criterion data store.

FIG. 3 is an example structure of a validation results data store.

DETAILED DESCRIPTION

Figure 1:
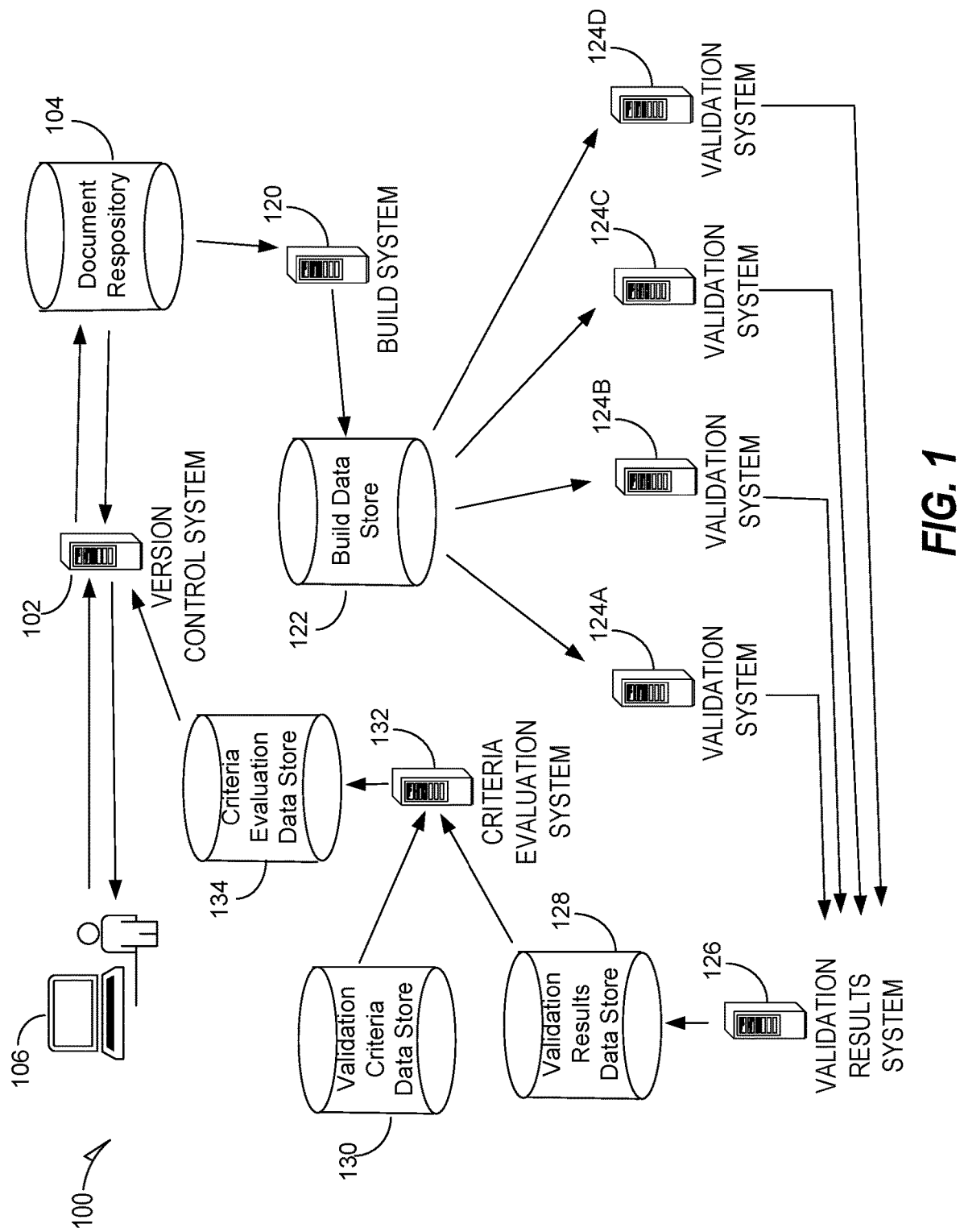
FIG. 1 is an overview diagram of a system implementing one or more of the disclosed embodiments.

As discussed above, traditional version control software is frequently used in software development environments. When using this traditional version control software (VCS), (e.g. Git), it can be difficult to identify last known good (LKG) points in time from which certain operations should be performed. For example, software engineers and other users of version control software perform tasks such as starting new work, releasing software, and integrating changes between divergent branches in the VCS.

Existing implementations of LKG identification are very entropy-prone; they often employ a single opportunity to mark a point in time as "good," such as at the end of a build process or test process. In part, this may be due to a lack of a need to identify multiple points in time as "good," and instead these systems assume that a most recent version of software is generally "good." If any of these systems are down at that point in time, the labelling of this point in time will fail and not be recovered. Recovering from such a state can be process intensive depending on the volume of the version control software, and potentially impossible if data from the build/test steps are not stored. Additionally, if builds and tests are asynchronous across the VCS and many labels/tags are being created at any one time, it may be difficult or impossible to determine which "known good" is the "last known good" from which the aforementioned operations should be performed because these validation steps may complete out of chronological order.

Thus, a technical problem exists in that a lack of any ability to recover from failed build attempts imposes a requirement to frequently perform the build process so that valid results are reliably available. However, performing a complete build of a complex software system requires a relatively large amount of processing power. Furthermore, in a complex software build environment, new documents are being checked into the version control system on a relatively frequent basis, necessitating a new build be initiated for each document submission. Thus, the combination of build frequency along with build cost imposes a large cost on software organizations in terms of computing resources.

The disclosed embodiments present a technical solution to this technical problem by providing for selective validation criteria across a set of user accounts and/or groups. The validation criterion is selective in that a first validation criteria selects for a set of build validation results meeting the criteria. A second validation criteria selects for a second set of build validation results that meet different criteria. The first and second set of build validation results may overlap, but in some embodiments do not overlap. For example, in one example embodiment, a first software team requires a build to include a first software module that compiles and passes unit tests successfully before that first build is considered usable by the first software team. A second software team does not depend on the first software module, and thus its validation criteria does not even consider any compile and or unit test results when determining whether the first build (or a second build) is useable by the second software team.

This disclosed solution is resilient to this entropy and consistently keeps track of which "known goods" meeting criteria of a particular user or group are the most recent. This is accomplished in an efficient manner, by avoiding a linear search of the VCS. Some embodiments accomplish this by monitoring validation systems and storing relevant results in a data store whose primary key or identifier is a unit of change in the VCS (in Git, this is the "commit" identifier) and which has a datetime of creation for each unit of change. In these embodiments, this data store is periodically queried for a record that meets validation criteria for at least one user or group's definition of a "known good" (build pass, tests pass). These embodiments then produce a label for this commit identifier within the VCS. By periodically evaluating validation criteria against new validation results produced by a build system, latency is reduced when a user subsequently requests documents based on a particular validation criteria. In these embodiments, the pre-computed labels can easily be identified without having to evaluate validation criteria against validation results in real time while the request for documents is pending. Thus, by de-serializing the labeling process with the requesting process, latency is reduced when documents are requested based on validation criteria.

FIG. 1 is an overview diagram of a system 100 implementing one or more of the disclosed embodiments. FIG. 1 shows a version control system 102. The version control system 102 is in communication with a document repository 104. A client device 106 is shown in communication with the version control system 102. The client device 106 submits documents to the version control system 102 and receives documents from the version control system 102. For example, in some embodiments, the client device 106 also requests one or more documents from the document repository 104. The client device 106 specifies which version of a particular document is being requested. For example, the client device 106 requests a most recent document in some embodiments. Alternatively, the client device 106 requests a document or documents meeting particular validation criteria which will be discussed further below.

A build system 120 receives documents from the document repository 104 and performs a build process, which generates build files, including, for example, executable files, and stores the files in a build data store 122. Generating the build files can include a compile process, a link process, or other processes that generate object files, executable files, or other files based on documents received from the document repository. The build process is generally performed multiple times. For example, after a first build is performed producing a first set of executable files, a document upon which the build depends may be edited or changed. A second build is then performed to incorporate the change, resulting in a different set of one or more executable files that are different versions of the first set of executable files generated by the first build process.

A plurality of validation systems, shown as validation systems 124A, 124B, 124C, and 124D, receive output (e.g. build results) of the build system 120 stored in the build data store 122. The validation systems are configured to run a variety of different tests. For example, in one embodiment, a first validation system 124A is configured to run a unit test process on a first set of software modules. A second validation system 124B is configured to run a unit test process on a second set of software modules. A third validation system 124C is configured to run an integration test process on output of the build system. A fourth validation system 124D is configured to run a system test process on the output of the build system. These are just examples. Each of the validation systems 124A-D provide results of their respective tests to the validation results system 126. Some embodiments include at least two different types of validation tests in their validation test results. The validation results system 126 stores the validation results in a validation results data store 128. In some embodiments, the build data store 122 and the validation results data store 128 are integrated into a single data store. In some embodiments, the validation results system 126 is integrated with the build system 120.

In some embodiments, the validation results stored in the validation results data store 128 are retrieved by the version control system 102. In some embodiments, validation results included in the validation results data store are evaluated by the version control system 102 against criterion to determine which versions of documents stored in the document repository 104 are retrieved for a particular user or group. In some other embodiments, a separate criteria evaluation system 132 retrieves validation results from the validation results data store 128 and evaluates these results against the validation criteria stored in the validation criteria data store. The criteria evaluation system 132 then provides the results of this evaluation to a criteria evaluation data store 134. The VCS 102 then queries the criteria evaluation data store 134 as needed or when requested.

As described in more detail below, some of the disclosed embodiments define a plurality of different validation criterion for different users and or groups. The different validation criteria evaluate validation results stored in the validation results data store. Based on the evaluation, the VCS 102 identifies a set of documents that meet the validation criterion. This set of documents is then provided, in at least some embodiments, to the client device 106. While FIG. 1 shows several separate data stores, such as the document repository 104, validation results data store 128, validation criteria data store 130, and the criteria evaluation data store 134, various embodiments combine any two or more of these data stores into a single physical data store. No requirement to physically separate the data discussed above should be inferred from the example illustration of FIG. 1.

Figure 2A:
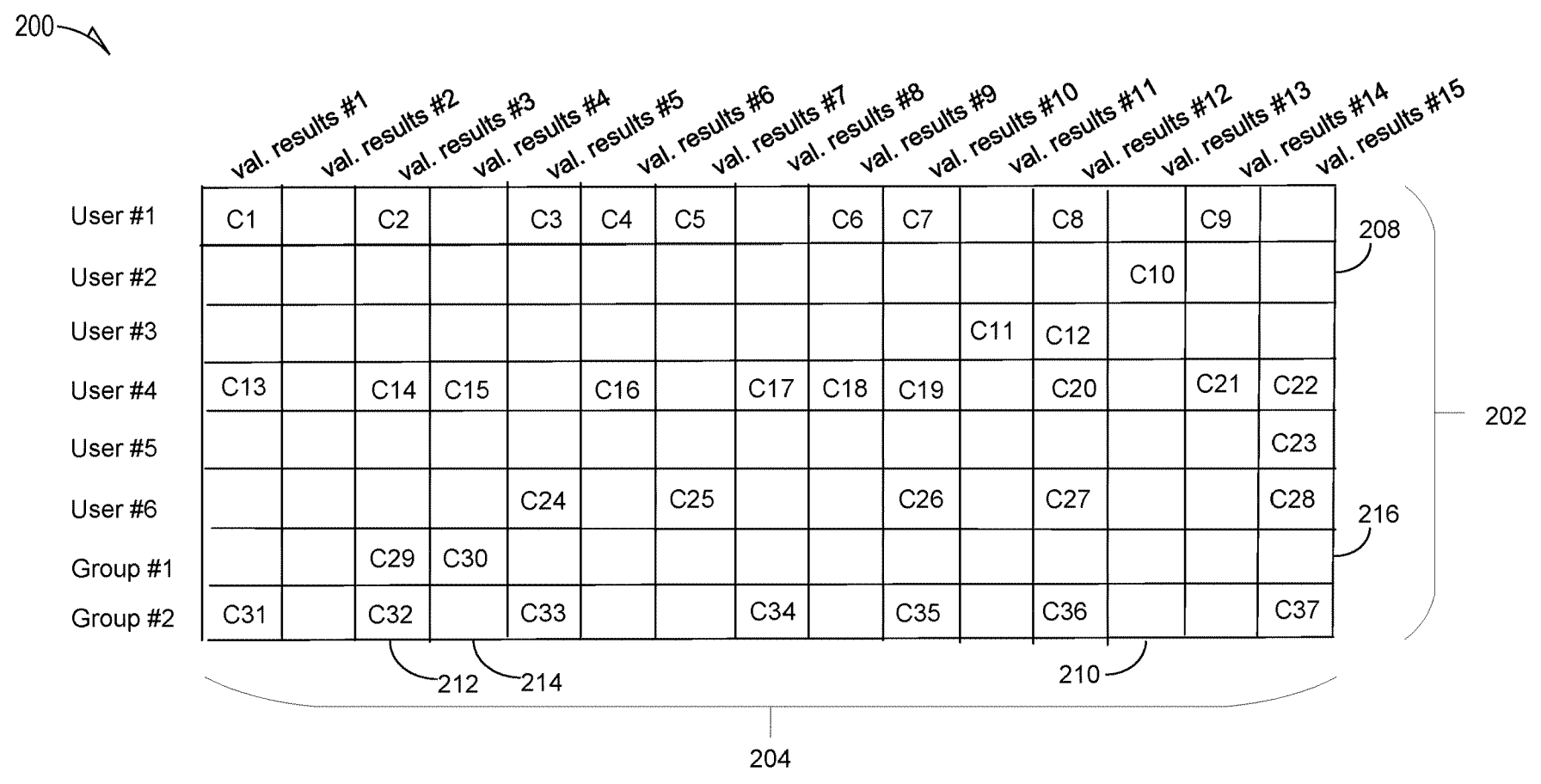

FIG. 2A is an example structure of a validation criteria data store 200. The example structure includes rows 202 and columns 204. Each of the rows 202 define validation criteria for a particular user or group. Each cell in each row define zero or more validation criterion included in the row's validation criteria. A validation criterion includes at least one operator and at least one constant or reference. The operator includes, in various embodiments, greater than (e.g. >), less than (e.g. <), greater than or equal to (e.g. >=), less than or equal to (e.g. <=), equal to (e.g. ==), not equal to (e.g. != or < >), or other operators. For example, a validation criterion defines a comparison, in some embodiments, between a validation result and a constant or a constant range. For example, in some embodiments, a validation test generates an indicator of a number of test errors and a number of test warnings detected by the test. Thus, one criterion in an example embodiments evaluates whether the number of test errors is equal to zero (0), and the number of test warnings is below a predefined constant value. If both conditions are true in this example embodiments, the validation criterion evaluates to a true value. Thus, in this example, the validation criterion can be written as ((numTestErrors==0) && numTestWarnings<MAXWARNINGS)). Other types of operators and/or criterion are also contemplated, with the above simply providing one example of how a validation criterion operates in at least some embodiments.

Each column of the validation criteria data store 200 represents a particular type of validation result. For example, a first column indicates, in some embodiments, results generated by validation system 124A while a second column represents results generated by validation system 124B. To determine a value of a row's validation criteria, each validation criterion included in the row (e.g. indicated by "C1", "C2", etc.) is evaluated against its corresponding validation results (defined by the column in which the criterion is included). If a cell of the validation criteria data store 200 does not include a criterion, then any evaluation of validation results corresponding to a column of the absent criterion is excluded when determining whether the validation criterion defined by the row are met.

If all of the validation criterion in a row evaluate to a true value, then the one or more validation criterion represented by the row also evaluates to true, otherwise, the validation criteria of the row evaluates to false overall. Thus, the validation criterion defined by a row are linked together via logical "and" operations to determine the row's value against a particular build or commit identifier, as discussed below.

As shown in FIG. 2A, user #2's validation criteria represented by row 208 defines validation criterion C10 which is evaluated against validation results #13 which is represented by column 210. If the evaluation results in a true value, then user #2's validation criteria is met with respect to at least a particular version of validation results #13. No other validation criterion are defined or required to evaluate to true in the example of user 2. Group #1 defines validation criterion for results #3, represented by column 212 and results #4, represented by column 214 to both evaluate to a true value in order for the validation criteria defined by the row 216 to evaluate to a true value. As discussed above, some embodiments store data representing information analogous to the example provided in FIG. 2A in the validation criteria data store 130.

Figure 2B:
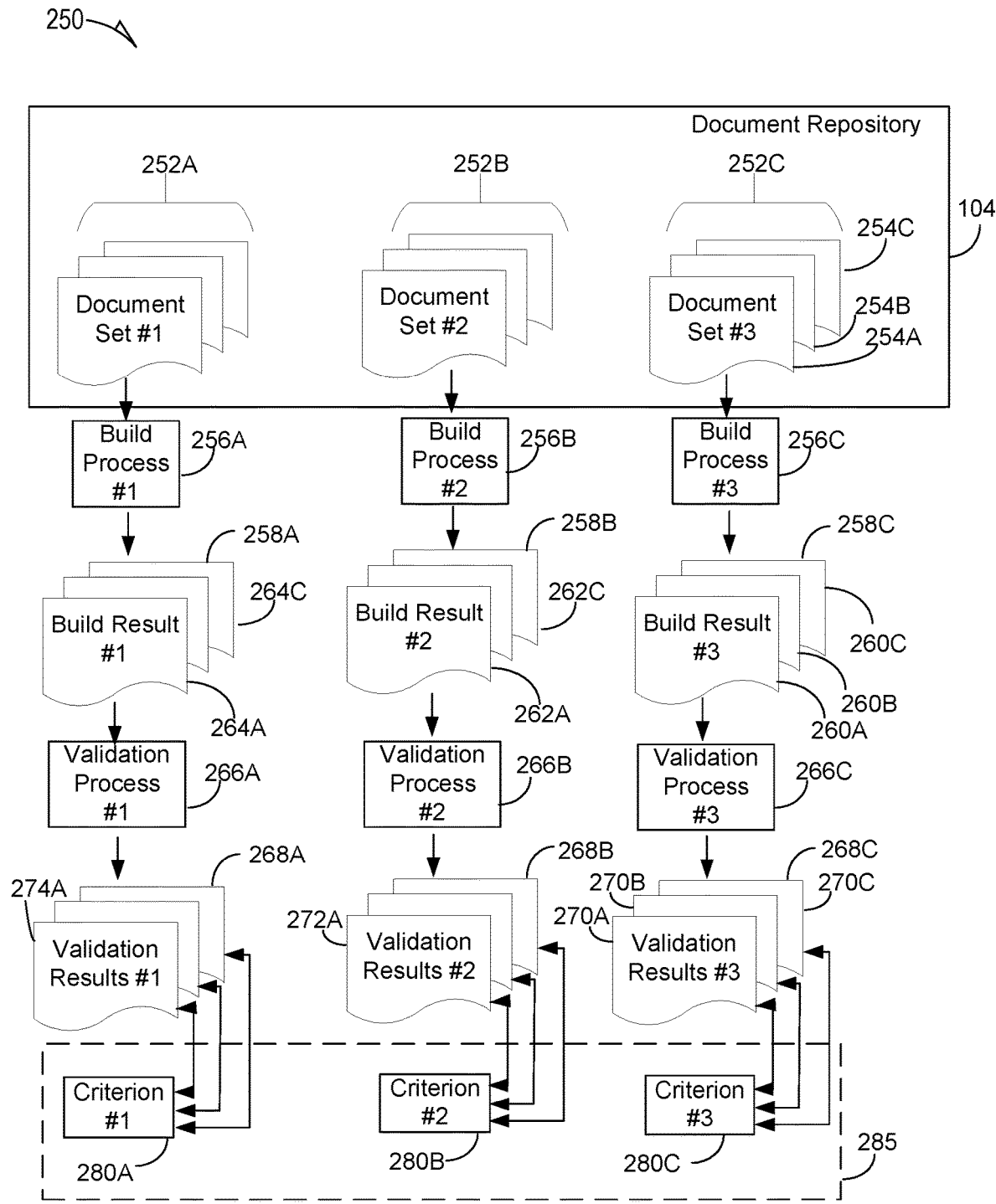
FIG. 2B is an example build data pipeline that is implemented in one or more of the disclosed embodiments.

FIG. 2B is an example build pipeline implemented in one or more of the disclosed embodiments. The example build pipeline 250 of FIG. 2B shows the document repository 104 of FIG. 1. Within the document repository 104 is shown three document sets labeled document set 252A, document set 252B, and document set 252C. Different versions of each of the document sets are illustrated in FIG. 2B as documents overlaid behind a most recent document set. For example, a most recent version of document set #3 is labeled 254A. A next most recent version of document set #3 is labeled as version 254B. An oldest version of document set #3 is labeled as version 254C. Different versions of document set 252A and document set 252B are not labeled in FIG. 2B to preserve figure clarity. Visually overlaid documents representing different versions of other data included in the build pipeline 250 are also illustrated in FIG. 2B. For example, different versions of build results and different versions of validation results are illustrated in FIG. 2B, and discussed further below.

The different versions of one or more documents in each of the document sets 252A-C are generated, in some embodiments, via manual editing of contents of the document(s), followed by performance of a "check-in" process, implemented by the VCS 102 of the document(s) to the document repository. In some embodiments, one or more of the different versions of a document in any one of the document sets 252A-C are programmatically generated.

The build pipeline 250 also illustrates that the document sets 252A-C are provided as input to three build processes, a first build process 256A, second build process 256B, and a third build process 256C. Note that in some embodiments, input provided to any one or more of the first build process 256A, second build process 256B, or third build process 256C can include documents from any one or more of the document sets 252A-C. One or more of the build processes 256A-C execute, in some embodiments, on the build system 120 discussed above with respect to FIG. 1. Examples of build processes include compiling, linking, reformatting, or other processes that transform input data into a different form, and generate output data (e.g. build results) based on the transformation.

The three build processes generate, based on the respective input, build results 258A-C respectively. Note that each of the example build results 258A-C is illustrated with multiple versions, shown via overlaid documents. For example, build result 258C is shown with three different versions labeled as 260A-C. The build results 258A-C are stored, in some embodiments, in the build data store 122, discussed above with respect to FIG. 1.

As discussed above, the disclosed embodiments contemplate that a plurality of builds are performed based on one or more documents in a document repository (e.g. documents in any one or more of the document sets 252A-C). As changes are made to documents in the document repository 104, some embodiments, in response to a change in one or more of the documents, perform a new build process, in part, to validate the changes made to the document. Some embodiments implement a minimum time between builds. Thus, for example, if a first change is made to a first document, these embodiments wait a predefined period of time before initiating a build (hoping to cover multiple document changes in a single build if a second or even a third change is made before the predefined period of time expires).

As these additional builds are performed, a plurality of different versions of build results are generated. Thus, for example, if each build generates X number of build results, and Y number of builds are performed, then a total of X*Y build results are generated by the Y builds. Build results associated with a common build are considered to be corresponding build results. Thus, in the example above, Y sets of corresponding build results are generated. Each of these build results are different versions than any build results generated by a previous build.

Turning to FIG. 2B again, a first version of each of build results 258A-C is comprised of build results 260A, 262A, and 264A. These different build results correspond to each other, in that they all derive from a single version of documents included in the document repository 104. This single version of documents is identified by a first identifier. In some embodiments, the identifier is a commit identifier. Other corresponding versions of build results (e.g. 264C, 262C, and 260C) derive from a different version of documents identified by a second identifier. An illustration of how build results and/or validation results correspond with identifiers is discussed in more detail below with respect to Table 1.

In some embodiments, the build results 258A-C are each a combination of one or more of an executable file, a library, a script file, a configuration file, an intermediate file, a web file (e.g. html file, css file, xml file) or other outputs of a build process.

The build pipeline 250 further illustrates three validation processes, shown as a first validation process 266A, a second validation process 266B, and a third validation process 266C. The validation processes 266A-C operate, in some embodiments, on one or more of the validation systems 124A-D discussed above with respect to FIG. 1.

Each of the validation processes receives, as input, build results. FIG. 2B shows that validation process 266A receives build result 258A. Validation process 266B receives build result 258B. Validation process 266C receives build result 258C. Note that each of the validation processes 266A-C could receive, in various embodiments, any portion of one or more of build results 258A-C. Additionally, inputs to each of the validation processes 266A-C at least partially overlap in some embodiments. The validation processes 266A-C include, in various embodiments, one or more of a unit test, integration test, system test, or any other validation process that is configured to verify an accuracy or integrity of an output (e.g. build result) of a build process. (e.g. any one or more of build processes 256A-C).

The build pipeline 250 shows that each of the validation processes 266A-C generate corresponding build process validation results 268A-C. The build process validation results 268A-C indicate results of a corresponding validation process (e.g. tests) on a particular build result (e.g. a particular version of one or more of the build results 258A-C). In some embodiments, one or more of the build process validation results 268A-C are stored in the validation results data store 128, discussed above with respect to FIG. 1.

The build pipeline 250 further illustrates multiple different versions of each of the validation results 268A-C. For example, while the validation results 268C are based on output from validation process 266C, the validation process 266C is run against different versions of build results (e.g. 260A-C), and generates corresponding different versions of validation results 268C, shown as versions 270A-C.

The build pipeline 250 also shows a first validation criteria 285, comprised of three validation criterion, including a first validation criterion 280A, second validation criterion 280B, third validation criterion 280C. Each of the three validation criterion are applied by at least some of the disclosed embodiments to different validation results produced by the build pipeline 250. For example, FIG. 2B shows the first validation criterion 280A applied to or evaluating validation result 268A. The second validation criterion 280B is shown applied to or evaluating validation result 268B. The third validation criterion 280C is shown being applied to or evaluating validation result 268C. Not only are the three different validation criterion 280A-C applied to different validation results, they are also applied, in some embodiments, to different versions of each of those validation results. For example, the validation criterion 280C is applied, in at least some embodiments, to each of validation results 270A-C. Similarly, each of the validation criterion 280A and 280B are shown being applied to multiple versions of the validation results 268A and 268B respectively.

The three validation criterion 280A-C are analogous to any one of the criterion discussed above with respect to FIG. 2A. Additionally, any result of an evaluation of any one of the validation criterion 280A-C is analogous to the validation results discussed below with respect to FIG. 3.

Some of the disclosed embodiments search a validation results data store based on validation criteria (e.g. 285). In some of these embodiments, the search queries the validation results data store for progressively older or less recent build identifiers, and corresponding validation results associated with those build identifiers. For example, since validation result 270A represents a most recent version of validation result 268C, in some embodiments, a validation results data store including the validation results of FIG. 2B is searched such that validation criterion 280C is first applied to evaluated against validation results 270A, then, assuming validation criteria 285 is not met, validation criterion 280C is then applied or evaluated against validation result 270B. If validation criteria 285 is still not met, validation criterion 280C is applied to or evaluated against validation result 270C.

Table 1 below illustrates relationships, in some embodiments, between different builds (each having a unique identifier, such as a commit identifier), document versions, build results, and validation results. Table 1 is organized such that data associated with a common build are positioned in a single column.

TABLE 1

| Identifier | 1 | 2 | 3 | 4 |
|---|---|---|---|---|
| Document A Version | 1 | 1 | 2 | 3 |
| Document B Version | 1 | 2 | 2 | 2 |
| Build Result #1 (e.g. 258A) | $BR1_1$ | $BR1_2$ | $BR1_3$ | $BR1_4$ |
| Build Result #2 (e.g. 258B) | $BR2_1$ | $BR2_2$ | $BR2_3$ | $BR2_4$ |
| Build Result #3 (e.g. 258AC) | $BR3_1$ | $BR3_2$ | $BR3_3$ | $BR3_4$ |
| Validation Result #1 (e.g. 268A) | $VR1_1$ | $VR1_2$ | $VR1_3$ | $VR1_4$ |
| Validation Result #2 (e.g. 268B) | $VR2_1$ | $VR2_2$ | $VR2_3$ | $VR2_4$ |
| Validation Result #3 (e.g. 268C) | $VR3_1$ | $VR3_2$ | $VR3_3$ | $VR3_4$ |

Table 1 above illustrates how particular document versions, build results, and validation results are associated with a particular build identifier. The build identifier is provided in a top row of Table 1 (e.g. a commit identifier). As discussed above with respect to FIG. 2B, documents within a document repository change for a variety of reasons, such as due to manual edits to contents of the document, or for other reasons, such as programmatic generation of said document. With each document change, in some embodiments, the VCS 102 updates an identifier that is used to track document updates and provide a unique identifier for a state of the document repository at any one point in time.

The topmost row of Table 1 shows an identifier that monotonically increases across columns of Table 1. Other embodiments update the identifier in a different manner and the example of Table 1 is not intended to be limiting. Versions of individual documents are decoupled from these monoatomic increases in the identifier. For example, Table 1 shows that version 1 of document "A" is used in a first build associated with an identifier value of one (1) and a second build associated with an identifier value of two (2). Similarly, a second (2) version of document "B" is used in a build having an identifier value of two (2) and a third build having an identifier value of three (3).

Thus, in the example of Table 1 above, builds are performed on versions of documents associated with each of the identifier values. The first build is performed based on version 1 of document "A" and version one (1) of document "B". The second build is performed based on version one (1) of document "A" and version two of document "B". The third build is performed based on version two (2) of document "A" and version two (2) of document "B." A fourth build is performed based on version three (3) of document "A" and version two (2) of document "B".

Table 1 further illustrates corresponding build results associated with a common identifier value. For example, build results labeled $BR1_1$, $BR2_1$, and $BR3_1$ are corresponding build results because they are each associated with a common identifier value (e.g. one (1). Similarly, $BR1_2$, $BR2_2$, and $BR3_2$ are corresponding build results because they are each associated with a common identifier value (e.g. two (2) in the example of Table 1). Similarly, $BR1_3$, $BR2_3$, and $BR3_3$ are corresponding build results because they are each associated with a common identifier value (e.g. two (2) in the example of Table 1).

Table 1 further illustrates corresponding validation results associated with a common identifier value. For example, validation results labeled VR11, VR21, and VR31 are corresponding validation results because they are each associated with a common identifier value (e.g. one (1). Similarly, $VR1_2$, $VR2_2$, and $VR3_2$ are corresponding validation results because they are each associated with a common identifier value (e.g. two (2) in the example of Table 1). Similarly, $VR1_3$, $VR2_3$, and $VR3_3$ are corresponding validation results because they are each associated with a common identifier value (e.g. two (2) in the example of Table 1). Further, validation results $VR1_1$, $VR2_1$, and $VR3_1$ correspond with $BR1_1$, $BR2_1$, and $BR3_1$ because these results are all associated with a common identifier value.

Figure 3:
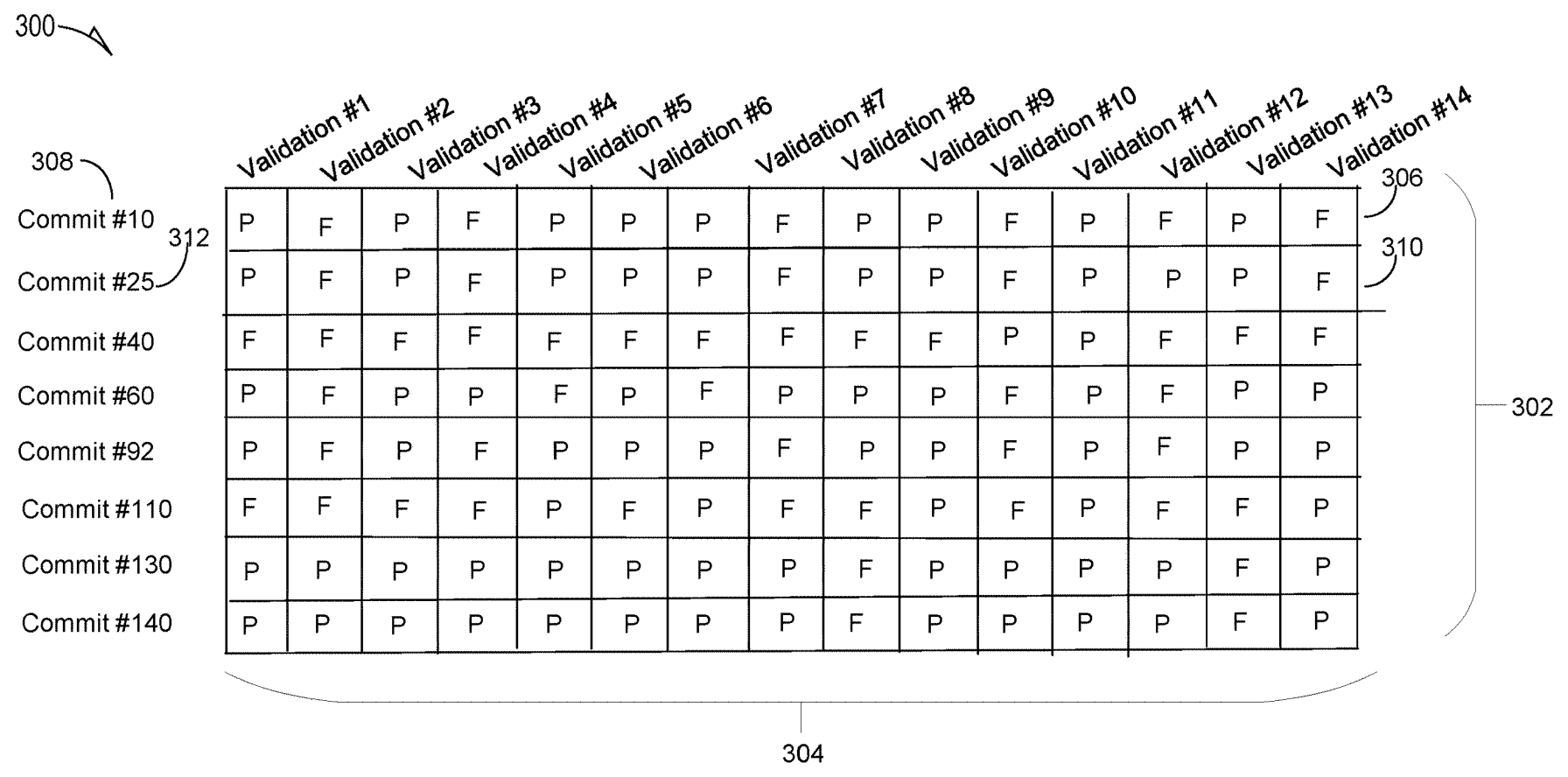

FIG. 3 is an example structure of a validation results data store 300. The validation results data store includes rows 302 and columns 304. Each row of the validation results data store 300 represents validation results on a version of build files identified via a common identifier, such as a commit ID. Each of the common identifiers therefore identify validation results of a different software build process. Thus, for example, a first row 306 is represented by a first commit ID 308 and a second row 310 is represented by a second commit identifier 312. In some embodiments, a commit ID, such as the first commit ID 308 and the second commit identifier 312, are based on a sequentially increasing identifier that is assigned to each sequential document check in to the version control system 102. In some embodiments, the commit identifies is a SHA-1 hash of contents of the documents included in the commit. Thus, for example, if a first user checks in a first document, some embodiments assign a first commit ID that identifies a version of documents in a document repository (e.g. document repository 104) at the time of the first check-in. A second user then checks in a second and third document at a second time. A second commit ID is assigned to documents as they exist when the second check in is performed. Thus, the second commit ID identifies the first, second and third documents, and specifically the versions of those documents at the time of the second check-in. Each row value (e.g. cell) for a particular commit ID indicates a result of a validation process associated with the row value. FIG. 3 shows a simplified example where results are indicated as binary pass/fail values. Other embodiments use a variety of validation value types, which could include scalar, vector, or any other data type.

In some embodiments, a validation criterion defined by a validation criteria data store (e.g. validation criteria data store 130 of FIG. 1 and/or validation criteria data store 200 of FIG. 2A) evaluates results stored in the validation results data store (e.g. validation results data store 128 of FIG. 1 or validation results data store 300 represented by FIG. 3). For example, some embodiments apply criterion defined by the validation criterion data store to one or more rows of a validation results data store. Some embodiments iterate through the validation results data store until a set of results (associated with a single commit ID —(e.g. a "row" in the table of FIG. 3) evaluates to a true value (e.g. all criterion defined by a validation criteria evaluate to true). This iteration starts with a most recently generated commit ID (in at least some embodiments), and progressively iterates to older commit IDs until a set of validation results meet the criteria. In some embodiments, the iteration is in first parent history order for a specific branch in the VCS. This method of iteration resolves ambiguity in iteration order that can arise when iterating backwards in time. The identified commit ID is then used to identify a set of documents. The set of documents is provided, in some embodiments, to a client device (e.g. 106).

Figure 4:
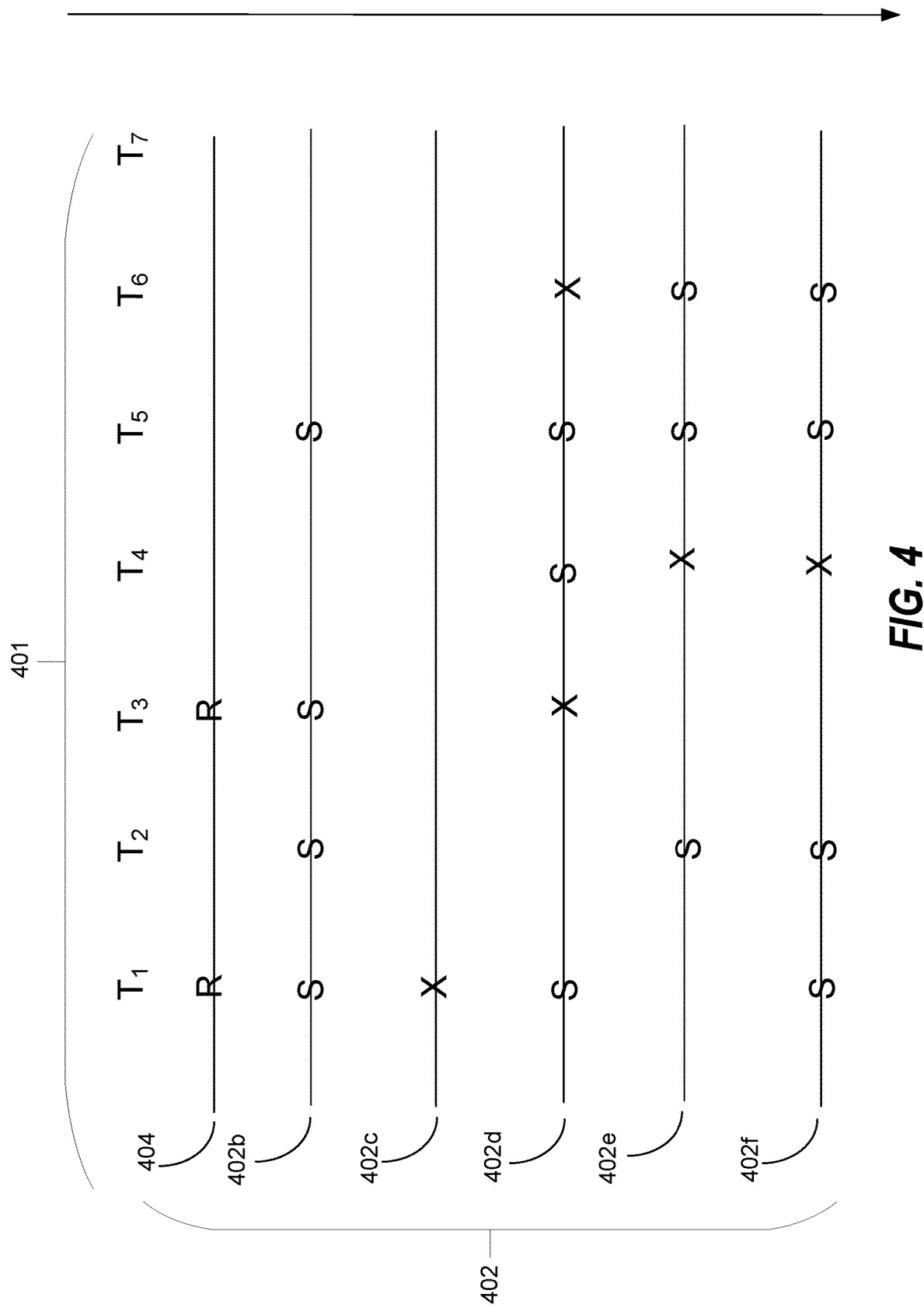
FIG. 4 shows an example sequence of build process validation results.

FIG. 4 shows an example sequence of build process validation results. FIG. 4 illustrates a plurality of tests or validations 401 that are run on a sequence of build results 402. FIG. 4 also shows a validation criteria 404, which requires the tests T1 and T3 to succeed. Individual sets of build results 402a-f are identified within the sequence of build results 402. Each of the individual sets of build results 402a-f corresponds with a different build identifier or commit ID. In other words, each of the individual sets of build results are generated from a different set of build or document files, for example, from the document repository 104. Successful build result validations are shown with a large "S" while failed build results are shown with a large "X". Build result validations that have not yet completed are not marked or are black. The individual sets of build results 402a-f are shown in time order, with earlier results shown at the top of the figure and later results shown below.

The disclosed embodiments recognize a technical problem presented by a system such as that described by FIG. 4. In particular, a software developer seeks to obtain a "last known good" set of documents that pass criteria specific to the software developer, their team, or perhaps an operation they intend to perform. An individual software developer's criteria differs from that of other developers, or at least other groups within an organization. Thus, while, for example, individual set of build results 402f is unacceptable for a first developer, due to the failure of test $T_4$. However, the build result 402f is perfectly acceptable to a second developer, who only cares about the results of tests $T_1$ and $T_2$. Furthermore, because builds are almost continuously being performed, and the results of those builds are somewhat unpredictable, it can be difficult or impossible to obtain a set of build results that meet a particular engineer's criteria, while also assuring that set of build results obtained is the most recent set of build results that meet the criteria.

To compensate for this problem, many development environment perform more frequent builds that would be desirable, in an attempt to ensure that there is a recent build that satisfies commonly applied criteria of a variety of different team members or groups.

The disclosed embodiments represent a technical solution to the technical problems described above. In particular, the disclosed embodiments apply criteria individually tailed to a particular user or group to a validation results data store. In some embodiments, the criteria are applied as that validation results data store is changing in real-time (e.g. via the completion of one or more tests and/or build processes that are running in parallel in some embodiments). By allowing individual users or groups to specify individual criteria for selection of builds based on their respective validation results, the disclosed embodiments provide an ability for individuals to obtain a latest known good version of documents that was impossible prior to the use of the disclosed embodiments.

Figure 5:
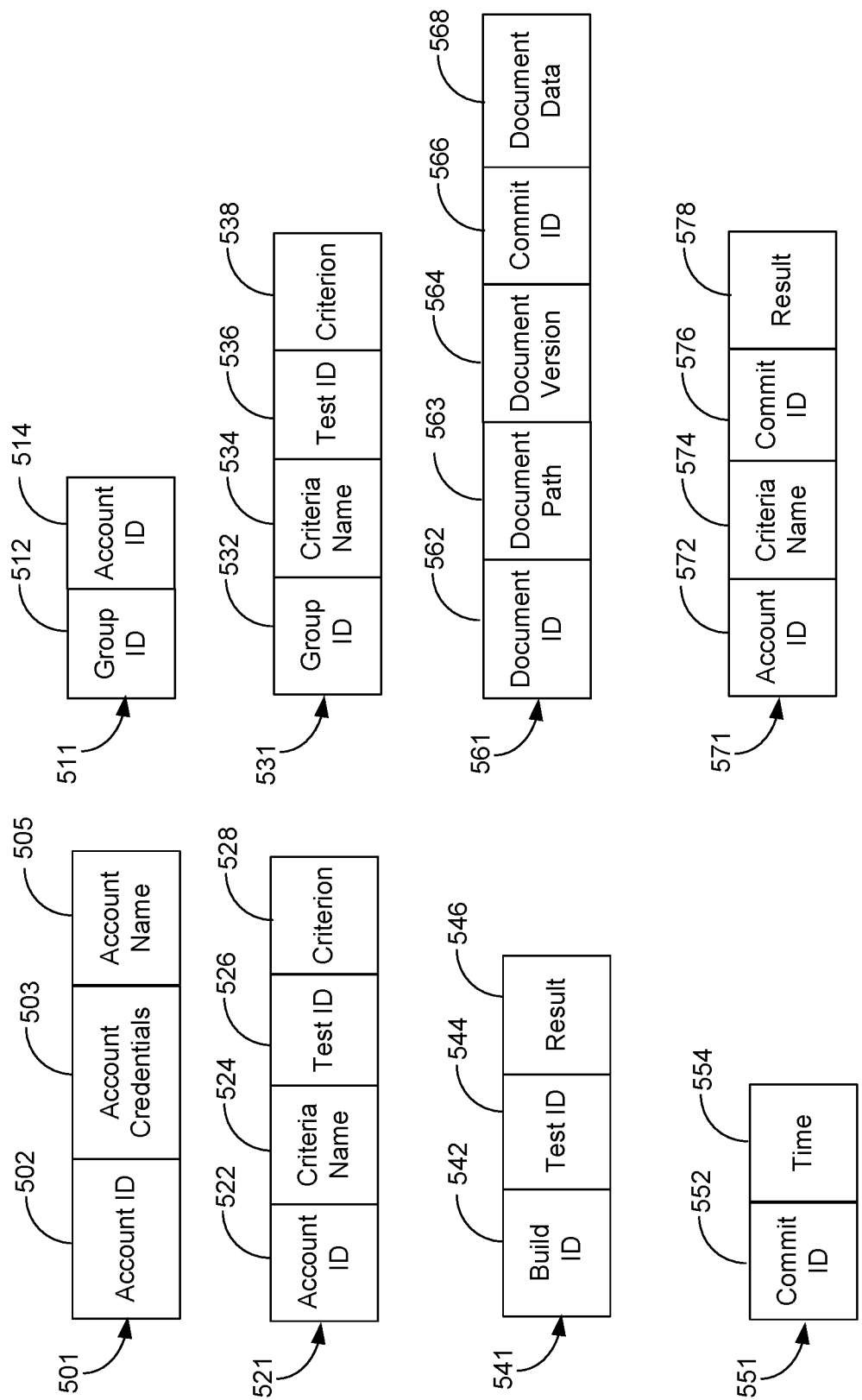
FIG. 5 shows example data structures implemented in one or more of the disclosed embodiments.

FIG. 5 shows example data structures implemented in one or more of the disclosed embodiments. While FIG. 5 discusses the example data structures as relational database tables, various embodiments use a variety of different data architectures. For example, relational databases, unstructured data stores, arrays, linked lists, trees, queues, or other data structures are used in various embodiments to implement one or more of the features discussed below.

FIG. 5 shows am account table 401, group table 511, account validation criterion table 521, group validation criterion table 531, and a validation results table 541. The account table 501 includes an account identifier field 502, account credentials field 503, and an account name field 505. The account identifier field 502 uniquely identifies an account. The account credentials field 503 identifies one or more authentication credentials necessary for obtaining access to resources associated with the account. The account name field 505 defines a name of the account. The group table 511 includes a group identifier field 512 and an account identifier field 514. The group identifier field 512 uniquely identifies a group. The account identifier field 514 identifies an account included in the group (identified via group identifier field 512). The account identifier field 514 is cross referenceable with the account identifier field 502.

The account validation criterion table 521 stores an account identifier field 522, criterion name field 524, test identifier field 526, and a criterion field 528. The account identifier field 522 uniquely identifies an account associated with validation criterion associated with the identified account. The criterion name field 524 defines a criterion name. In some embodiments, a combination of the account identifier field 522 and criterion name field 524 uniquely identifies one or more validation criterion (e.g. analogous to a row of validation criteria data store 200 discussed above with respect to FIG. 2A). The test identifier field 526 identifies a particular validation or test to which a criterion is applied (e.g. the criterion defined by criterion field 528). For example, the test identifier field 526 identifies, in some embodiments, results from one of the validation systems 124A, 124B, 124C, or 124D. The criterion field 528 defines one or more criterion applied to the identified test results. Thus, in some embodiments, one row of the account validation criterion table 521 represents one cell of the example validation criteria data store 200.

The group validation criterion table 531 includes a group identifier field 532, criterion name field 534, test identifier field 536, and a criterion field 538. The group identifier field 532 uniquely identifies a group associated with validation criterion defined by a row of the group validation criterion table 531. The group identifier field 532 is cross referenceable with the group identifier field 512. The criterion name field 534 defines a criterion name. In some embodiments, a combination of the group identifier field 532 and criterion name field 534 uniquely identifies one or more validation criterion (e.g. a row of the validation criteria data store 200 discussed above with respect to FIG. 2A). The test identifier field 536 identifies a particular validation or test to which a criterion is applied (e.g. the criterion defined by criterion field 538). For example, the test identifier field 536 identifies, in some embodiments, results from one of the validation systems 124A, 124B, 124C, or 124D. The criterion field 538 defines one or more criterion applied to the identified test results. Thus, in some embodiments, one row of the group validation criterion table 531 represents one cell of the example validation criteria data store 200.

The validation results table 541 includes a build identifier field 542, test identifier field 544, and a result field 546. The build identifier field 542 identifies, in some embodiments, a commit ID representing a set of documents that were validated. The build identifier field 542 value represents an identifier common to each validation result in a particular row of the validation results data store 300, discussed above with respect to FIG. 3.

The test identifier field 544 identifies a particular validation of the set of documents. For example, in some embodiments, the test identifier field 544 identifies validation results generated by a particular one of the validation systems 124A-D, or other validation results. The result field 546 identifies the validation results. Thus, in some embodiments, a row of the validation results table 541 represents a single cell of the example validation results data store 300, discussed above with respect to FIG. 3.

The commit table 551 includes a commit identifier field 552 and a time field 554. The commit identifier field 552 uniquely identifies a submission to a document repository (e.g. document repository 104). The commit identifier field 552, in some embodiments, is incremented each time a submission is made. The increment occurs, in some embodiments, once for each submission, even if the submission includes multiple documents. The time field 554 defines a time associated with the submission (that is identified by the commit identifier field 552).

The document table 561 includes a document identifier field 562, document path field 563, document version field 564, commit identifier field 566, and document data field 568. The document identifier field 562 uniquely identifies a particular document. For example, the document identifier, in some embodiments, uniquely identifies a document having a unique name (including a document path) within a document repository. The document path field 563 defines a location of the document within a document repository (e.g. "/etc/dev/test"). The document version field 564 identifies a unique version of the document (the document identified via document identifier field 562). The commit identifier 566 identifies a commit identifier associated with the document version (e.g. combination of document identifier field 562 value and document version field 564 value). The document data field 568 defines data of the identified document. In some embodiments, the document data defines the complete document. In some embodiments, the document data field 568 defines delta information that, when used in conjunction with prior versions of the document (e.g. identified via document identifier field 562, and in some embodiments, document path field 563), defines a current or most recent version of the document. Note that in some embodiments, the commit table 551 and the document table 561 are integrated into a single table.

The criteria evaluation table 571 includes an account identifier field 572, criteria name field 574, commit identifier field 576, and a result field 578. The account identifier field 572 uniquely identifies an account, and is cross referenceable with the account identifier field 502 and account identifier field 522. The criterion name field 574 defines a name of a validation criteria, and is cross referenceable with the criterion name field 524. The commit identifier field 576 uniquely identifies a set of files associated with a particular build (e.g. build identifier 542), as discussed above. The result field 578 stores a result of the validation criteria (identified via the account id field 572 and criteria name field 574, Some embodiments periodically evaluate validation criteria defined by the embodiments against validation results of builds as those builds are performed. This provides for less latency in identifying a build matching particular validation criteria when such a build is requested.

Figure 6:
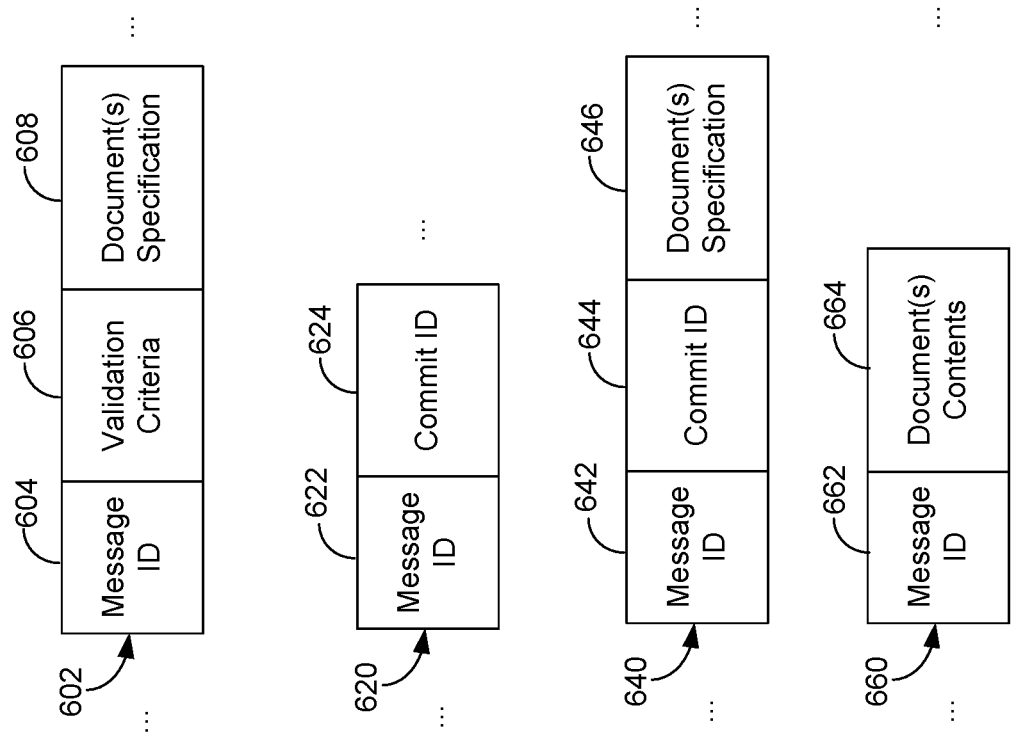
FIG. 6 shows example message portions implemented in one or more of the disclosed embodiments.

FIG. 6 shows example message portions implemented in one or more of the disclosed embodiments. Message portion 602 includes a message identifier field 604, validation criteria field 606, and a document(s) specification field 608. The message identifier field 604 defines a type of the message. For example, the message type indicates, in various embodiments whether the message requests documents from a document repository, provides documents from the document repository, or provides an identifier of documents in the document repository. The validation criteria field 606 identifies a validation criteria. For example, the validation criteria field 606 identifies, in some embodiments, data analogous to a row in the validation criteria data store 200, discussed above with respect to FIG. 2A. In some embodiments, the validation criteria field 606 defines one or more regular expressions, or programming code (e.g. script code) that implement validation criteria. The document(s) specification field 608 identifies one or more documents in a document repository. In some embodiments, the document(s) specification field 608 defines a document path and/or a document name (e.g. corresponding to information stored in document identifier field 562 and/or document path field 563 in some embodiments). In some embodiments, the message identifier field 604 is set to indicate, via a predefined value, the message portion 602 requests the specified document from a document repository. The message further indicates the requested document(s) need to correspond with validation results meeting a validation criteria specified by the validation criteria field 606. In some embodiments, the message portion 602 is transmitted by a client device (e.g. client device 106) to a version control system (e.g. version control system 102) to request documents identified via the document(s) specification field 608, and that pass build process validation tests which meet the criteria specified by the validation criteria field 606.

Message portion 620 includes a message identifier field 622 and a commit identifier field 624. The message identifier field 622 identifies a type of the message portion 620. The commit identifier field 624 defines an identifier, which is used, in some embodiments, to identify a set of documents corresponding to particular validation results. In some embodiments, the message portion 620 is sent by the version control system 102 to a client device (e.g. client device 106), identifying a commit identifier that meats a validation criterion previously specified in message portion 602.

Message portion 640 includes a message identifier field 642, commit identifier field 644, and document(s) specification field 646. In some embodiments, the message identifier field 642 is set to a predefined identifier that indicates a request for documents defined by the document(s) specification field 646, and the commit identifier field 644. For example, in some embodiments a client device (e.g. client device 106) requests documents via message portion 640, after the commit identifier specified in field 644 has been obtained by the client device via message portion 620.

Message portion 660 includes a message identifier field 662 and a document(s) specification field 664. In some embodiments, the message identifier field 662 is set to a predefined value that indicates the message portion 660 provides document contents. For example, the message portion 660 is transmitted, in some embodiments, by the version control system 102 to the client device 106, in response to the message portion 640 being received by the version control system 102 from the client device 106.

Figure 7:
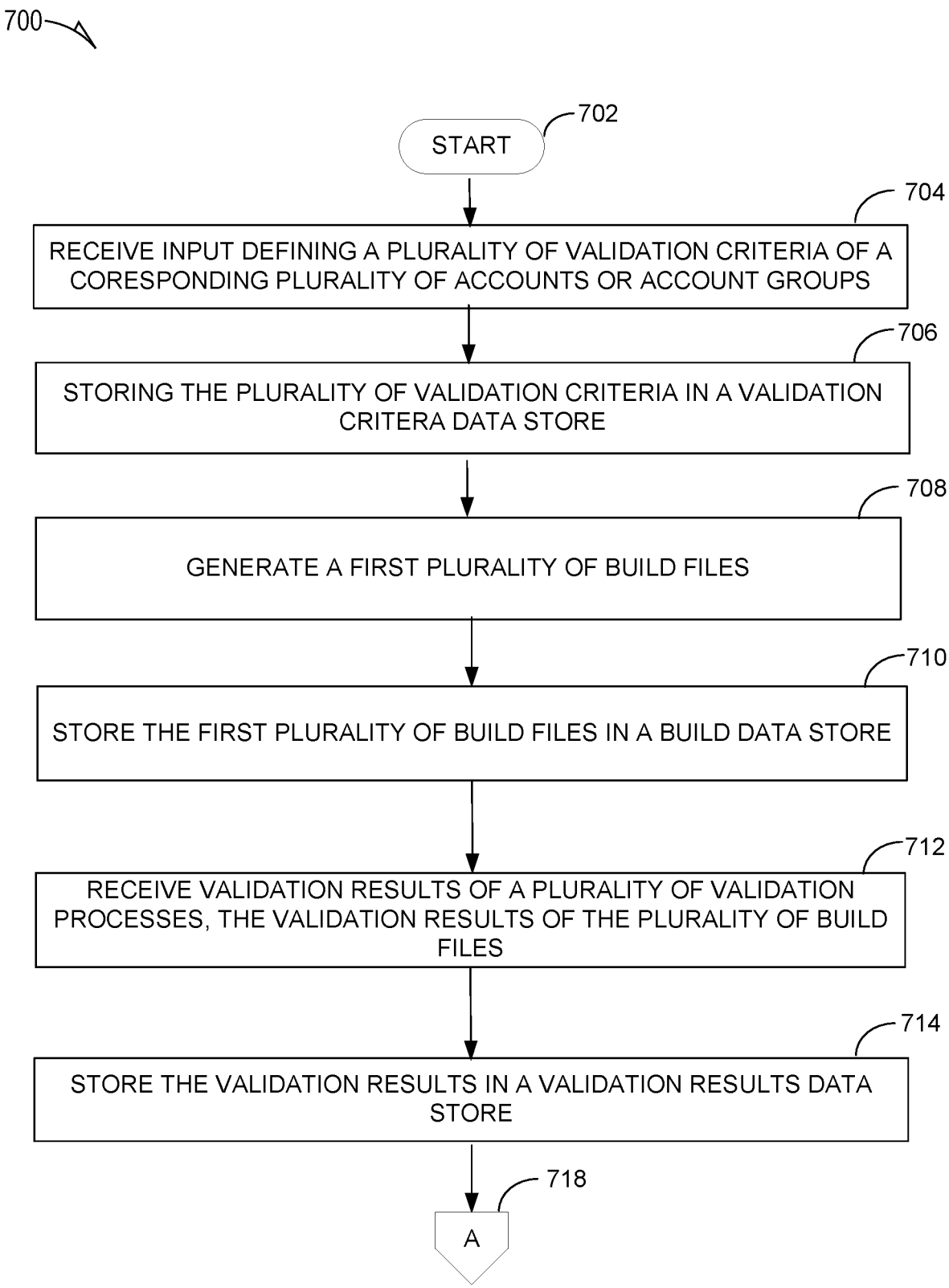
FIG. 7 is a flowchart of a method of defining a set of documents.

FIG. 7 is a flowchart of a method of defining a set of documents. In some embodiments, one or more of the functions discussed below with respect to method 700 and FIG. 7 are performed by hardware processing circuitry. For example, in some embodiments, instructions (e.g. 1024 discussed below) stored in a memory (e.g. memory 1004 and/or 1006) discussed below, configure the hardware processing circuitry (e.g. processor 1002 discussed below) to perform one or more of the functions associated with FIG. 7 and discussed below.

In some embodiments, one or more of the functions discussed below with respect to FIG. 7 are performed by the version control system 102.

After start operation 702, method 700 moves to operation 704. In operation 704, input defining a plurality of validation criteria of a corresponding plurality of accounts or account groups is received. For example, in some embodiments, the input defines a plurality of "rows" of the validation criteria data store 200 discussed above with respect to FIG. 2A. In some embodiments, each of the plurality of validation criteria include a plurality of criterion, each criterion evaluating different validation results of a build process (e.g. a software build process). For example, as discussed above with respect to FIG. 2A, each "cell" of the example validation criteria data store 200 includes criterion that evaluates, for example, validation results generated by, for example, the validation systems 124A-D.

In operation 706, the plurality of validation criteria are stored in a validation criteria data store. For example, after receiving input defining the validation criteria for a user or group, a version control system (e.g. the version control system 102) stores information defining the validation criteria in a validation criteria data store 130 (e.g. validation criteria data store 130 and/or 200).

In operation 708, a first plurality of build files are generated. For example, in some embodiments, documents included in a document repository (e.g. document repository 104) are processed by compilers, linkers or other systems to generate output files. The output files include one or more of executable files, batch files, data files, library files or other file types.

In operation 710, the first plurality of build files are stored in a build store data store. For example, in some embodiments, the output files discussed above are written to a build data store (e.g. the build data store 122 discussed above with respect to FIG. 1).

In operation 712, validation results generated by a plurality of validation processes are received. The validation results are of the plurality of build files. For example, in some embodiments, the validation results are received by a validation results system (e.g. validation results system 126). In some embodiments, the validation results received in operation 712 are analogous to a single "row" of the example validation results data store 300, discussed above with respect to FIG. 3. Thus, in some embodiments, the validation results are associated with a single or common build identifier or commit ID. The build identifier or commit ID identifies a combination of documents and document versions used to generate the build files that were validated to generate the validation results.

In operation 714, the validation results are stored in a validation results data store. For example, in some embodiments, the validation results system 126 stores the validation results in the validation results data store 128.

Off page reference 718 indicates that method 700 continues on FIG. 8, discussed below.

Figure 8:
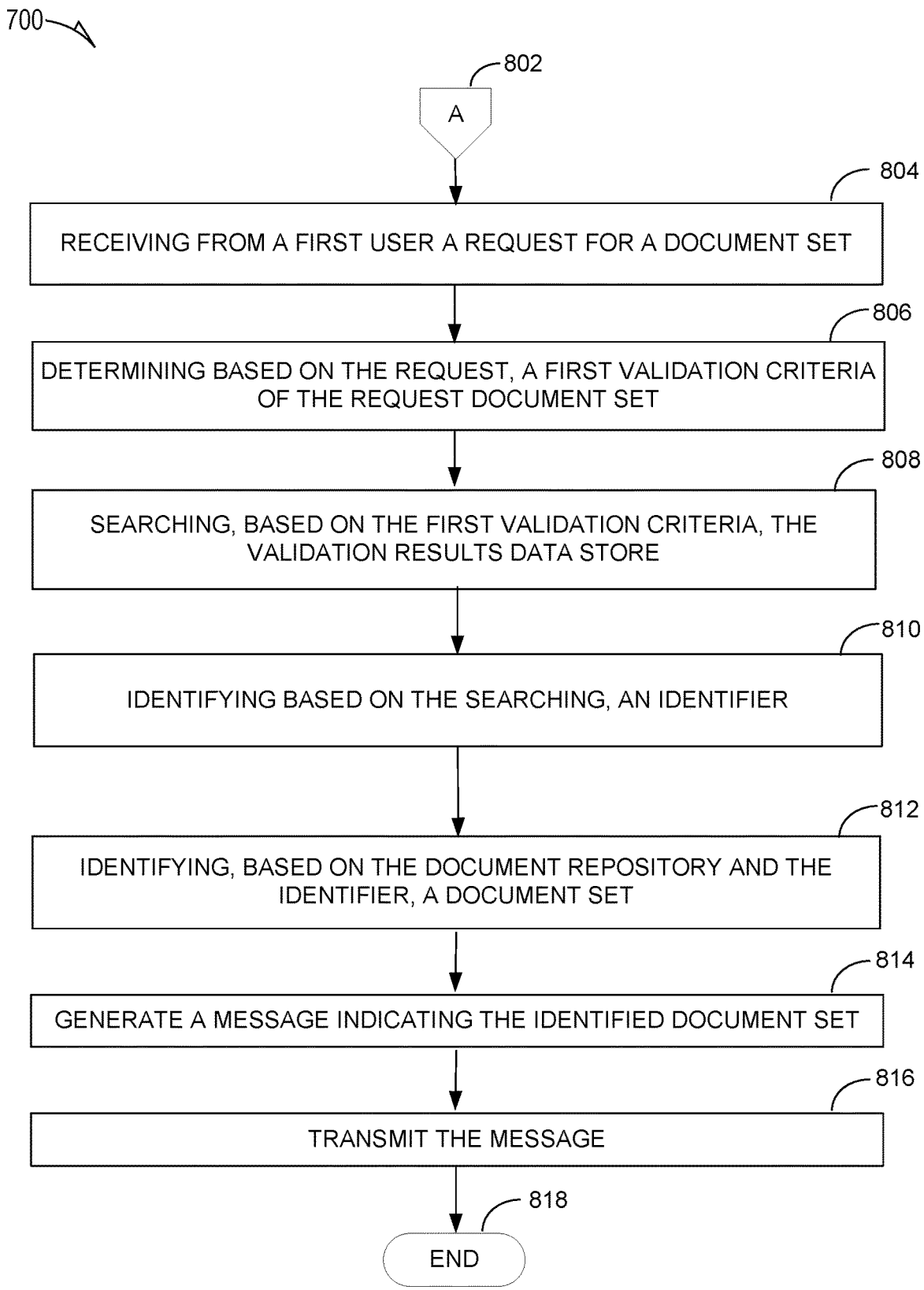
FIG. 8 is a continuation of method discussed above with respect to FIG. 7.

FIG. 8 is a continuation of method 700, discussed above with respect to FIG. 7.

After off page reference 802, method 700 moves to operation 804, where a request from a first user is received. The request references a document set. The document set is identified, in some embodiments, based on a file path within a document repository (e.g. document repository 104). In some embodiments, the request is from a client device, such as client device 106. In some embodiments, client device 106 sends a network message to the version control system 102 requesting the document set. The network message indicates the document set, and indicates a validation criterion the document set passes. For example, the example message portion 602 illustrates a network message indicating a validation criteria (e.g. via field 506) and a document specification (e.g. via field 608). The document specification can indicate, for example, a file name or a file path identifying the requested document set, at least in some embodiments.

In some embodiments, the validation criterion is identified by searching a validation criteria data store based on the first user. For example, some embodiments organize validation criterion by user. In some embodiments, a combination of the first user's identifier and a name of a criteria is used to identify the validation criteria. Thus, in some embodiments, a request from a second user that references an equivalent validation criteria name, is specifying a different validation criteria than the first user, since, as mentioned above, in some embodiments, validation criteria names (e.g. field 524) are user or group specific.

In operation 806, a first validation criteria is determined based on the request. For example, some embodiments of operation 806 decode or otherwise parse the network message to identify the first validation criteria (e.g. which is defined by validation criteria field 506 in some embodiments). In some embodiments, the message itself defines the validation criteria (e.g. via regular expression). In other embodiments, the message indicates an index or other identifier that identifies data in a validation criteria data store (e.g. validation criteria data store 130).

In operation 808, the validation results data store is searched based on the first validation criteria. In some embodiments, the validation results data store is searched for a result set. Results in the result set are associated with a common build identifier (e.g. commit ID). The result set is analogous, in some embodiments, to a row of the validation results data store 300, discussed above with respect to FIG. 3. In some embodiments, the validation results data store is searched for results matching or otherwise satisfies one or more validation criterion. In some embodiments, if all validation criterion included in a set of validation criteria evaluate to true values when evaluated against results of build processes of a particular build, the build (e.g. output files associated with a common identifier such as a commit identifier) is considered to match the criteria. In some embodiments, if a first set of validation results does not satisfy any one criterion included in the first validation criteria, the disclosed embodiments search the validation results data store for a second set of validation results that were validated during a time range earlier than the first set of validation results. Similarly, the search can iteratively proceed through less and less recent commit identifiers/build identifiers to identify sets of validation results meeting the first validation criteria.

In operation 810, an identifier is identified based on the search. The identifier corresponds to a build identifier or commit ID in some embodiments (e.g. a commit ID identifying validation results in a common row of the validation results data store 300). The identifier is associated with validation results satisfying the first validation criteria.

In operation 812, a document set is identified based on the common identifier. For example, in some embodiments, documents associated with a commit identifier (common identifier) are identified in operation 812. As discussed above with respect to FIG. 5, some embodiments maintain data structures that associate commit identifiers to particular versions of a set of documents (e.g. via the commit table 551 and document table 561).

In operation 814, a message is generated indicating the identified document set. For example, in some embodiments, the message is generated to indicate the common identifier (e.g. via message portion 620 in some embodiments).

In operation 816, the generated message is transmitted. In some embodiments, the generated message is transmitted to a device associated with the request received in operation 804 (e.g. a client device, such as client device 106 of FIG. 1). In some embodiments, a client device (e.g. client device 106), then requests and receives copies of documents identified by the common identifier (e.g. via message portion 640 discussed above in some embodiments). A device performing method 700 then responds to the message portion 640, in some embodiments, with a message including one or more of the fields discussed above with respect to message portion 660.

After operation 816 completes, method 700 moves to end operation 818.

Note that while method 700 describes operations 804-818 in a particular order, there is no implication that a particular order is required or intended. For example, in some embodiments, operations 806-814 are performed periodically for a plurality of different validation criteria on validation results as those results become available for analysis. In these embodiments, after a request for a particular document set meeting a certain validation criteria is received, the previously pre-computed information indicating which validation results match which validation criteria is consulted, and an appropriate commit identifier is selected based on the stored pre-computed information. As discussed above with respect to FIG. 5 and the criteria evaluation table 571, some embodiments pre-compute and store data indicating which commit identifiers "pass" or "fail" which validation criteria. In these embodiments, requests for documents that indicate a validation criteria cause consultation of the precomputed data indicating which identifiers pass or fail which validation criteria. Documents responsible to the request are then selected by identifying a commit identifier from these pre-computed results that passes the specified criteria. Since the criteria are evaluated before the request for a document is received, the request can be processed with less latency.

Some embodiments of method 700 include receiving, from a second user, a second request for a second software build file set, the second request indicating a second validation criteria. The build data store is then searched, based on the second validation criteria. From this second search, a second document set is identified, and a second message generated indicating the identified second document set (e.g. message portion 640 indicating the second document set via field 646). This message is this transmitted (e.g. by the version control system 102 to the client device 106).

As discussed above, some embodiments identify validation results from a validation results data store (e.g. 128). These embodiments identify a common identifier for a set of validation results (e.g. identifying a row in validation results data store 300). These results are then evaluated against validation criteria. If the results pass the validation criteria (e.g. evaluate to a true value as described above). A first document set is then identified based on the common identifier associated with the results set that meets or passes the criteria. Note as described above, each of the identified documents has a particular version that corresponds with the common identifier. For example, as described above, in one example embodiment, the document table 561 defines particular document versions associated with particular commit identifiers (e.g. a common identifier). Note that if the first validation results do not meet the criteria, some embodiments search the validation results data store for a second set of validation results. If the second set of validation results also do not meet the criteria, some embodiments again search the validation results data store for a third set of validation results. This third set of validation results are then evaluated against the validation criteria. This process iterates, in at least some embodiments, until either a set of validation results is found that meets the criteria or the search reaches some limit, such as the entire validation results data store is searched, or a predefined maximum number of results is evaluated.

Figure 9:
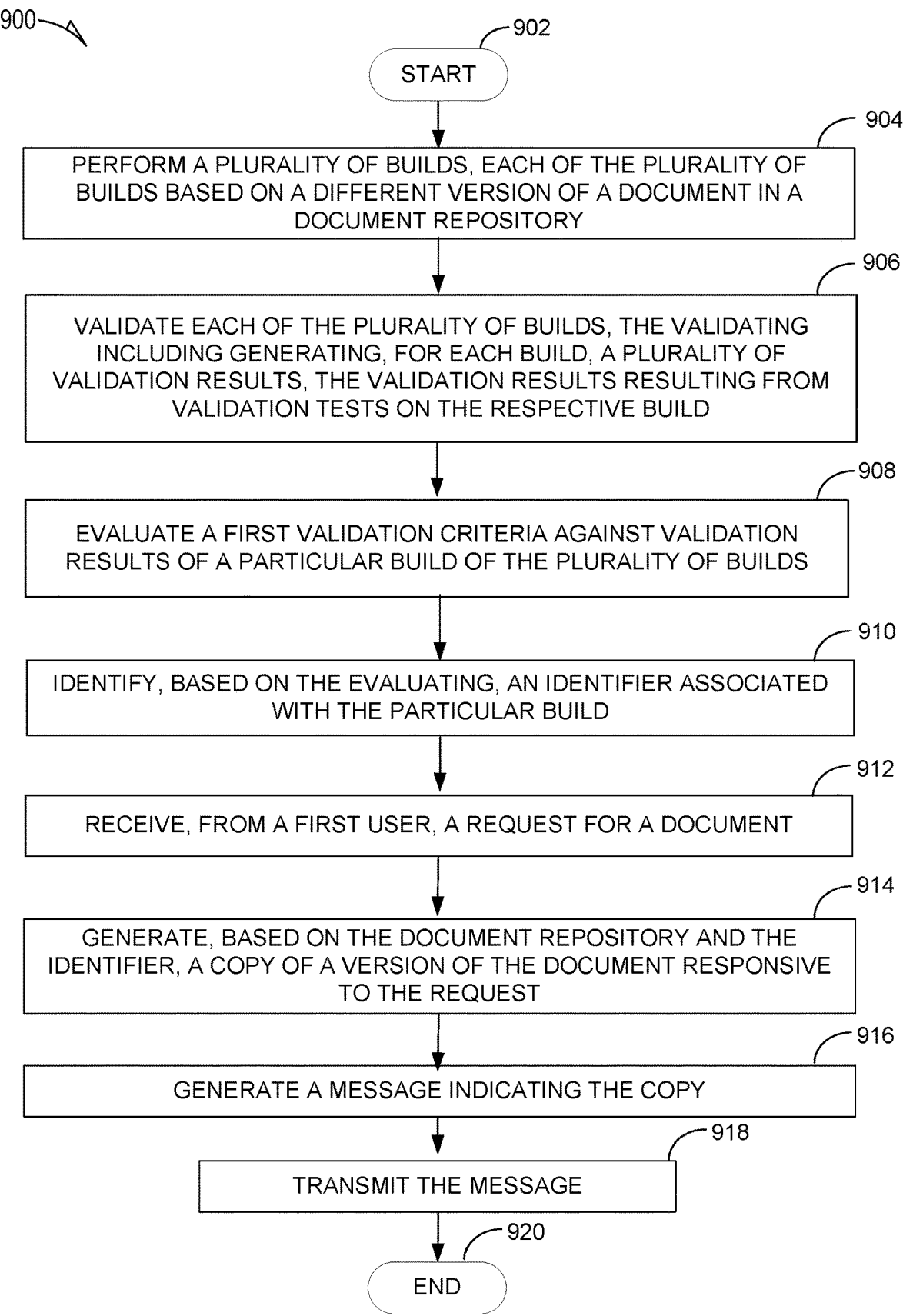
FIG. 9 is a flowchart of a method of identifying a version of a document.

FIG. 9 is a flowchart of a method of defining a set of documents that meet a validation criteria. In some embodiments, one or more of the functions discussed below with respect to method 900 and FIG. 9 are performed by hardware processing circuitry (e.g. one or more hardware processors). For example, in some embodiments, instructions (e.g. 1024 discussed below) stored in a memory (e.g. memory 1004 and/or 1006) discussed below, configure the hardware processing circuitry (e.g. processor 1002 discussed below) to perform one or more of the functions associated with FIG. 9 and discussed below.

After start operation 902, method 900 moves to operation 904, which performs a plurality of builds. As discussed above with respect to FIG. 2B, in some embodiments, a build includes executing a plurality of build processes (e.g. any one or more of 256A-C), which receive, as input, one or more documents from a document repository (e.g. document repository 104 and documents included one or more of the document sets 252A-C). As also discussed above with respect to FIG. 2B, changes to one or more documents included in the document repository result in different versions of those changed documents. In some embodiments, a build is performed as a result of a change in a document. In some embodiments, the build is performed to validate that the change to the document is acceptable for broader use, among other reasons. As illustrated with respect to FIG. 2B above, the plurality of build processes each generate build results (e.g. build results 258A-C). The build results include, in various embodiments, one or more of executable files, libraries, data files such as configuration files, web files such as html files, css files, xml files, or other data resulting from a transformation performed by a build process (e.g. 256A-C).

Thus, operation 904 performs a plurality of builds, with each of the plurality of builds based on at least one different version of a document when compared to other builds of the plurality of builds.

In operation 906, each of the plurality of builds is validated. For example, results generated by the build processes, discussed above with respect to operation 904 (e.g. one or more of build results 258A-C), are provided to a plurality of validation processes (e.g. validation processes 266A-C, such as a unit test, integration test, or system test). As also discussed with respect to at least FIG. 2B, each of these validation processes generates a validation result (e.g. as shown in FIG. 2B, each of validation processes 266A-C generates corresponding validation results 268A-C). Validation results for a common build are considered corresponding validation results, in that they indicate different validations of a common build, with the common build based on a single set of documents having a single set of corresponding versions (e.g. there is generally no variability between documents used as a basis to produce corresponding validation results). Each row of validation results data store 300, discussed above with respect to FIG. 3, represent corresponding validation results. Results in different rows of the validation results data store 300 are not corresponding. Some embodiments of operation 906 store each of the plurality of corresponding validation results in a validation result data store.

In operation 908 a first validation criteria is evaluated against validation results of a particular build of the plurality of builds. The first validation criteria includes a plurality of validation criterion. As discussed above with respect to FIG. 2A, the example validation criteria data store 200 defines validation criteria in a row of the table shown in the figure. Each of these criterion are applied to a different validation result, with each different validation result indicated in a column in which the criterion is placed. The validation results of each build of operation 908 is analogous to a row of the validation results data store 300 discussed above with respect to FIG. 3. Corresponding validation results are also illustrated in FIG. 2B. For example, validation results 270A, 272A, and 274A are corresponding. Table 1 above also describes corresponding validation results. For example, Table 1 illustrates that corresponding validation results are associated with a common build identifier value. Thus, validation results $VR1_1$, $VR2_1$, and $VR3_1$ are corresponding validation results as they are all associated with a common build identifier value, with that value being one (1). Similarly, $VR1_2$, $VR2_2$, and $VR3_2$ are corresponding validation results, because they are all associated with build identifier value two (2).

Operation 910 identifies, based on the evaluating of operation 908, an identifier associated with the particular build. Note that each validation result of a particular build is associated with a common identifier. (e.g. each validation result in a row of the validation results data store 300, discussed above with respect to FIG. 3, is associated with a commit identifiers shown on the left side of the row. The particular build is also associated with that common identifier. Similarly, each document in a set of documents upon which the particular build is based is also associated with the common identifier (see for example, commit identifier field 566 of the document table 561). Thus, a build is associated with an identifier that is also associated with documents upon which the build is based. This identifier is also associated with corresponding validation results of the build.

Some embodiments of method 900 periodically perform operations 904-910. For example, in some embodiments, new validation results of a new build are included in the validation results data store. These new corresponding validation results are associated with a new identifier (e.g. just as validation results $VR1_1$, $VR2_1$, $VR3_1$ are associated with a particular identifier value in Table 1 (e.g. identifier value one (1)). Some embodiments then evaluate the new validation results against the first validation criteria. Results of the evaluation are then stored in a criteria evaluation data store (e.g. criteria evaluation data store 134) in some embodiments.

In operation 912, a request for a document is received. The request is received, in some embodiments, from a client device (e.g. client device 106). In some embodiments, the request includes one or more of the fields discussed above with respect to message portion 602. In some embodiments, the message indicates a user that initiated the request. Some embodiments of operation 912 decode or parse the received request to identify a user making the request.

In some embodiments, the validation criteria data store is search based on the first user specified in the request, and the first validation criteria is identified based on the search. For example, as discussed above with respect to FIG. 2A, in some embodiments a validation criteria data store associates one or more validation criteria with a user or group of users. Thus, in some embodiments, a request indicates both a user and a validation criteria name, which can then be used to identify validation criteria from the validation criteria data store. In other embodiments, the request indicates the validation criteria directly in the request itself, and there is no need to look up the validation criteria in the validation criteria data store.

In the embodiments discussed above that periodically detect new validation results (which correspond) and evaluate those results against one or more validation criteria, operation 912 queries the evaluation data store to identify a set of corresponding validation results that satisfy a validation criteria indicated by the request (e.g. either via a user making the request or explicit identification of the validation criteria in the request (e.g. via field 606 of message portion 602 in some embodiments). Satisfying a validation criteria, in some embodiments, occurs when each validation criterion defined by the validation criteria evaluates to a true value when applied to a particular set of corresponding validation results.

In operation 914, a copy of the document responsive to the request is generated. The copy of the document is based on the document repository and the identifier. For example, as discussed above with respect to document table 561, some embodiments associate a particular version of a document with a commit identifier. Thus, some embodiments of operation 914 generate the copy of the document by searching the document table 561 for the identifier to identify the document. An identifier of the document itself is also needed, in at least some embodiments, to accomplish the search (e.g. match with document identifier field 562). This identifier is indicated in the request, at least in some embodiments.

Operation 916 generates a message indicating the copy. For example, some embodiments generate a message including one or more of the fields of message portion 620, which identifies the document via the identifier, such as a commit identifier (e.g. via field 624). Some other embodiments of operation 916 generate the message to include the copy of the document itself.

In operation 918, the generated message is transmitted. In some embodiments, the message is transmitted to a device that sent the request of operation 912 (e.g. a client device, such as the client device 106). In some embodiments, a client device (e.g. client device 106), then requests (after receiving the generated message) and receives copies of documents identified by the common identifier (e.g. via message portion 640 discussed above in some embodiments). A device performing method 900 then responds to the message portion 640, in some embodiments, with an additional message including one or more of the fields discussed above with respect to message portion 660.

Some embodiments of method 900 include receiving input from a user, for example, via a user interface. In some embodiments, the input is read from a file or received via a network interface (e.g. via a network packet). The input defines the first validation criteria. Upon receiving the input, method 900 stores the first validation criteria in the validation criteria data store.

In some embodiments, the input defining the first validation criteria associates a first user or group with the first validation criteria, and associates a second validation criteria with a second user or group. For example, FIG. 2A shows validation criteria associated with particular users or groups. In some embodiments of method 900, the first validation criteria defines first evaluations of validation results of a build of the plurality of builds, and the second validation criteria defines second evaluations of the validation results of the build of the plurality of builds. Note that the first validation criteria and the second validation criteria reference or define an evaluation of different validation results. For example, the first validation criteria defines an evaluation of a first validation result, while the second validation criteria ignores or does not reference the first validation result. Examples of these differences are provided in FIG. 2A, which shows different conditions defined for different validation criteria.

Some embodiments receive a second request. The second request indicates, either directly or via a user indicated by the request, a second validation criteria. Some of these embodiments search the validation results data store for validation results that satisfy the second validation criteria. If such validation results are identified, an identifier value (e.g. commit identifier) corresponding to the identified validation results is then identified (e.g. as illustrated above with respect to Table 1). Based on the identifier value, a particular version of a document requested by the second request is then identified (e.g. as illustrated above with respect to Table 1, which illustrates particular document versions associated with particular identifier values). Some embodiments of method 900 then generate a second response to the second request and transmit the second response.

Some embodiments of method 900 progressively search through a data store of validation results to identify a set of validation results that meet a particular criteria. These embodiments may begin the search with a most recent set of corresponding validation results, but then continue to search back in time as needed until a set of corresponding validation results that meet the criteria are identified. Thus, these embodiments of method 900 determine a first plurality of corresponding validation results associated with a first common identifier. For example, Table 1 above illustrates corresponding validation results columns of Table 1. The corresponding validation results are associated with the identifier in the same column.

A different view of corresponding validation results is illustrated in rows of the example validation results data store 300, illustrated above with respect to FIG. 3. In FIG. 3, corresponding validation results are associated with identifiers shown to the left of each row. For example, commit identifier #10, labeled 308, is associated with corresponding validation results in the first row 306 of the table shown in FIG. 3.

Embodiments that search a validation results data store evaluate the first validation criteria against the first validation results. For example, the first validation criteria is analogous to any validation criteria in any row of the example validation criteria data store 200, discussed above with respect to FIG. 2A. The first validation criteria is also analogous to the validation criteria 285, including validation criterion 280A, validation criterion 280B, and validation criterion 280C, discussed above with respect to FIG. 2B. As shown in FIG. 2B, the validation criterion 285 is evaluated against corresponding validation results 268C of FIG. 2B. Based on the evaluation of the first validation criteria against the first validation results, a determination is made that the first validation results pass the first validation criteria. For example, in some embodiments, when all validation criterion included in a validation criteria evaluate to a true value against corresponding validation results, those validation results are considered to pass the validation criteria.

As discussed above with respect to Table 1 which shows corresponding validation results in columns of Table 1, a build identifier is associated with each set of corresponding validation results. Thus, once a set of validation results that pass a validation criteria are identified, the build identifier associated with, or corresponding to those results is identified. In some embodiments, this is accomplished since the validation results are associated with the build identifier (e.g. validation results table 541 also illustrates a data structure that associated a validation result (e.g. result field 546) with a build identifier (e.g. build identifier field 542)).

In embodiments that search the validation results data store as discussed above, some of these embodiments identify second validation results associated with a second common identifier. For example, if a first identified set of validation results do not meet the criteria being evaluated, the search continues, in at least some embodiments, by identifying a second plurality of corresponding validation results. The first validation criteria are then evaluated against the second plurality of corresponding validation results, and, in some embodiments, a determination is made that the second plurality of corresponding validation results do not pass the first validation criteria. As discussed above, some embodiments continue the search until a set of corresponding validation results is found that passes the first validation criteria.

After operation 918 completes, method 900 moves to end operation 920.

Figure 10:
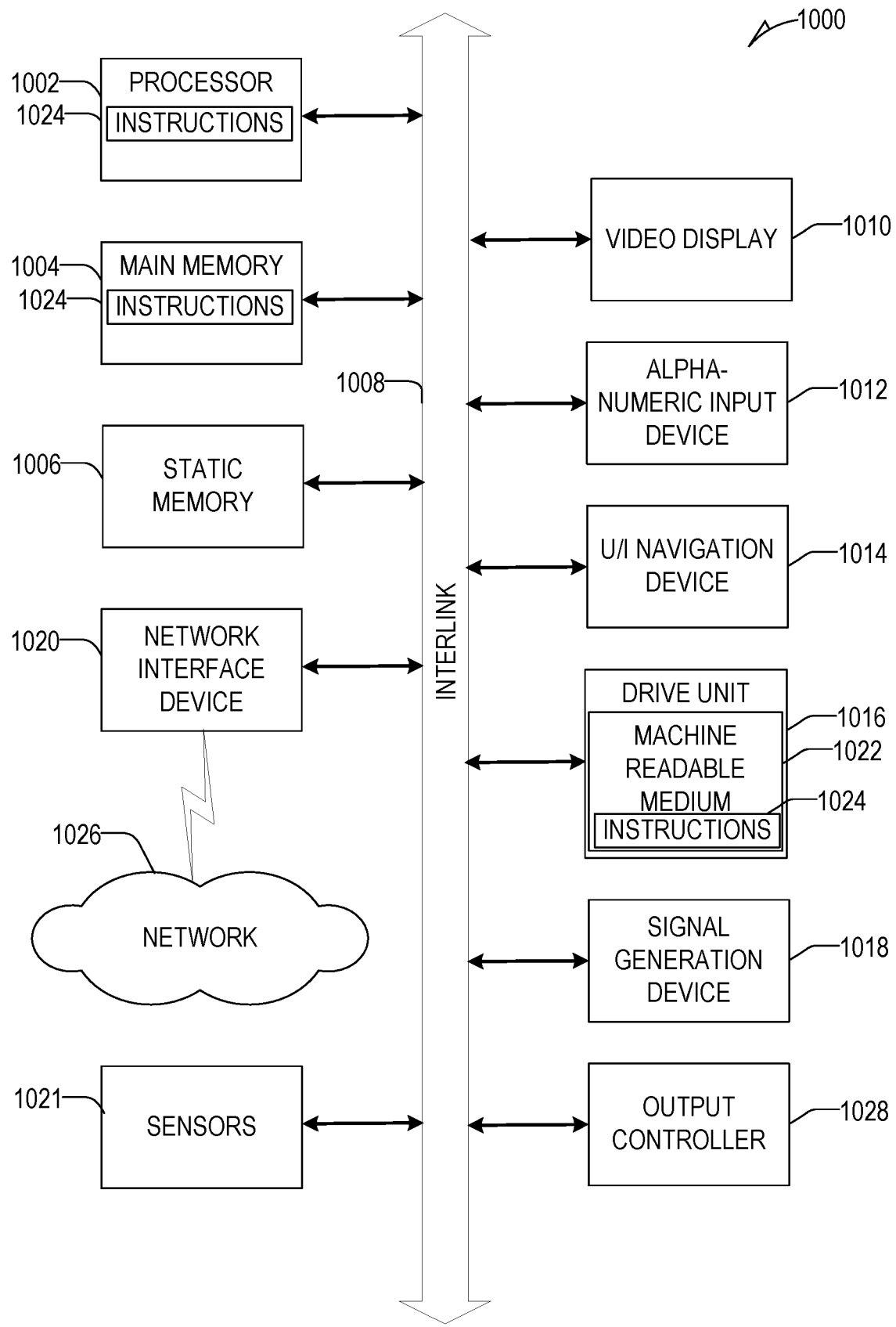
FIG. 10 illustrates a block diagram of an example machine upon which any one or more of the techniques (e.g., methodologies) discussed herein may perform.

FIG. 10 illustrates a block diagram of an example machine 1000 upon which any one or more of the techniques (e.g., methodologies) discussed herein may perform. In alternative embodiments, the machine 1000 may operate as a standalone device or are connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 is a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 1000 may perform one or more of the processes described above with respect to FIGS. 1-9 above. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms (all referred to hereinafter as "modules"). Modules are tangible entities (e.g., hardware) capable of performing specified operations and is configured or arranged in a certain manner. In an example, circuits are arranged (e.g., internally or with respect to external entities such as other circuits) in a specified manner as a module. In an example, the whole or part of one or more computer systems (e.g., a standalone, client or server computer system) or one or more hardware processors are configured by firmware or software (e.g., instructions, an application portion, or an application) as a module that operates to perform specified operations. In an example, the software may reside on a non-transitory computer readable storage medium or other machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software may accordingly configure a hardware processor, for example, to constitute a particular module at one instance of time and to constitute a different module at a different instance of time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink 1008 (e.g., bus). The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 are a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 1024 may further be transmitted or received over a communications network 1026 using a transmission medium via the network interface device 1020. The machine 1000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. In some examples, the network interface device 1020 may wirelessly communicate using Multiple User MIMO techniques.

Examples, as described herein, may include, or may operate on, logic or a number of components, modules, or mechanisms. Modules are tangible entities (e.g., hardware) capable of performing specified operations and are configured or arranged in a certain manner. In an example, circuits are arranged (e.g., internally or with respect to external entities such as other circuits) in a specified manner as a module. In an example, the whole or part of one or more computer systems (e.g., a standalone, client, or server computer system) or one or more hardware processors are configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Example 1 is a method, comprising: performing a plurality of builds, each of the plurality of builds based on a different version of a document in a document repository; validating each of the plurality of builds, the validating including generating, for each respective build: a plurality of validation results, each of the validation results resulting from a different validation test on the respective build; evaluating a first validation criteria against the validation results of a particular build of the plurality of builds; identifying, based on the evaluating, an identifier associated with the particular build; receiving a first request for the document; generating, based on the document repository and the identifier, a copy of a version of the document that is responsive to the first request; generating a message identifying the copy of the document; and transmitting the message.

In Example 2, the subject matter of Example 1 optionally includes wherein the validating of each of the plurality of builds further comprises storing, for each of the plurality of builds, validation results of the respective build in a validation results data store, the method further comprising: periodically identifying, from the validation results data store, new validation results of a new build, the new validation results associated with a new identifier; second evaluating the first validation criteria against the new validation results; storing new results of the second evaluating in a data store; receiving a second request for a second document, the second request received subsequent to the second evaluating; and referencing the new results in response to the second request.

In Example 3, the subject matter of Example 2 optionally includes receiving input from a user, the input defining the first validation criteria; storing the first validation criteria in a validation criteria data store; identifying, based on the first request, a first user; searching, based on the first user, the validation criteria data store; and identifying, based on the searching, the first validation criteria.

In Example 4, the subject matter of Example 3 optionally includes second searching, based on a second user, the validation criteria data store; and identifying, based on the second searching, a second validation criteria.

In Example 5, the subject matter of any one or more of Examples 3-4 optionally include wherein the input defining the first validation criteria associates a first user or group with the first validation criteria, and associates a second validation criteria with a second user or group, the first validation criteria defining first evaluations of validation results of a build of the plurality of builds, and the second validation criteria defining second evaluations of the validation results of the build.

In Example 6, the subject matter of Example 5 optionally includes wherein the first validation criteria references a result of a validation test and the second validation criteria excludes any reference to the validation test.

In Example 7, the subject matter of any one or more of Examples 3-6 optionally include receiving, from a second user, a second request, the second request indicating a second validation criteria; second searching, based on the second validation criteria, the validation results data store; identifying, based on the second searching, a second document responsive to the request; generating a second message indicating the identified second document; and transmitting the second message.

In Example 8, the subject matter of any one or more of Examples 1-7 optionally include determining first validation results associated with a first common identifier; second evaluating the first validation criteria against the first validation results; determining, based on the second evaluating, that the first validation results pass the first validation criteria; and identifying, based on the determining, the document, the document having a respective version associated with the first common identifier.

In Example 9, the subject matter of Example 8 optionally includes identifying second validation results associated with a second common identifier; third evaluating the first validation criteria against the second validation results; and determining, based on the third evaluating, that the second validation results do not pass the first validation criteria, wherein the determining of the first validation results is in response to the second validation results not passing the first validation criteria.

In Example 10, the subject matter of Example 9 optionally includes searching, based on the second common identifier, a validation results data store, wherein the identifying of the second validation results is based on the search; second searching, based on a time range earlier than a time associated with the second common identifier, the validation results data store; and identifying, based on the second searching, the first common identifier.

Example 11 is a system, comprising: hardware processing circuitry; and one or more hardware memories storing instructions that when executed configure the hardware processing circuitry to perform operations comprising: performing a plurality of builds, each of the plurality of builds based on a different version of a document in a document repository; validating each of the plurality of builds, the validating including generating, for each respective build: a plurality of validation results, each of the validation results resulting from a different validation test on the respective build; evaluating a first validation criteria against the validation results of a particular build of the plurality of builds; identifying, based on the evaluating, an identifier associated with the particular build; receiving a first request for the document; generating, based on the document repository and the identifier, a copy of a version of the document that is responsive to the first request; generating a message identifying the copy of the document; and transmitting the message.

In Example 12, the subject matter of Example 11 optionally includes wherein the validating of each of the plurality of builds further comprises storing, for each of the plurality of builds, validation results of the respective build in a validation results data store, the operations further comprising: periodically identifying, from the validation results data store, new validation results of a new build, the new validation results associated with a new identifier; second evaluating the first validation criteria against the new validation results; storing new results of the second evaluating in a data store; receiving a second request for a second document, the second request received subsequent to the second evaluating; and referencing the new results in response to the second request.

In Example 13, the subject matter of Example 12 optionally includes the operations further comprising: receiving input from a user, the input defining the first validation criteria; storing the first validation criteria in a validation criteria data store; identifying, based on the first request, a first user; searching, based on the first user, the validation criteria data store; and identifying, based on the searching, the first validation criteria.

In Example 14, the subject matter of Example 13 optionally includes the operations further comprising: second searching, based on a second user, the validation criteria data store; and identifying, based on the second searching, a second validation criteria.

In Example 15, the subject matter of any one or more of Examples 13-14 optionally include wherein the input defining the first validation criteria associates a first user or group with the first validation criteria, and associates a second validation criteria with a second user or group, the first validation criteria defining first evaluations of validation results of a build of the plurality of builds, and the second validation criteria defining second evaluations of the validation results of the build.

In Example 16, the subject matter of Example 15 optionally includes wherein the first validation criteria references a result of a validation test and the second validation criteria excludes any reference to the validation test.

In Example 17, the subject matter of any one or more of Examples 13-16 optionally include the operations further comprising: receiving, from a second user, a second request, the second request indicating a second validation criteria; second searching, based on the second validation criteria, the validation results data store; identifying, based on the second searching, a second document responsive to the request; generating a second message indicating the identified second document; and transmitting the second message.

In Example 18, the subject matter of any one or more of Examples 11-17 optionally include the operations further comprising: determining first validation results associated with a first common identifier; second evaluating the first validation criteria against the first validation results; determining, based on the second evaluating, that the first validation results pass the first validation criteria; and identifying, based on the determining, the document, the document having a respective version associated with the first common identifier.

In Example 19, the subject matter of Example 18 optionally includes the operations further comprising: identifying second validation results associated with a second common identifier; third evaluating the first validation criteria against the second validation results; and determining, based on the third evaluating, that the second validation results do not pass the first validation criteria, wherein the determining of the first validation results is in response to the second validation results not passing the first validation criteria.

In Example 20, the subject matter of Example 19 optionally includes the operations further comprising: searching, based on the second common identifier, a validation results data store, wherein the identifying of the second validation results is based on the search; second searching, based on a time range earlier than a time associated with the second common identifier, the validation results data store; and identifying, based on the second searching, the first common identifier.

Example 21 is a non-transitory computer readable storage medium comprising instructions that when executed configure hardware processing circuitry to perform operations comprising: performing a plurality of builds, each of the plurality of builds based on a different version of a document in a document repository; validating each of the plurality of builds, the validating including generating, for each respective build: a plurality of validation results, each of the validation results resulting from a different validation test on the respective build; evaluating a first validation criteria against the validation results of a particular build of the plurality of builds; identifying, based on the evaluating, an identifier associated with the particular build; receiving a first request for the document; generating, based on the document repository and the identifier, a copy of a version of the document that is responsive to the first request; generating a message identifying the copy of the document; and transmitting the message.

In Example 22, the subject matter of Example 21 optionally includes wherein the validating of each of the plurality of builds further comprises storing, for each of the plurality of builds, validation results of the respective build in a validation results data store, the operations further comprising: periodically identifying, from the validation results data store, new validation results of a new build, the new validation results associated with a new identifier; second evaluating the first validation criteria against the new validation results; storing new results of the second evaluating in a data store; receiving a second request for a second document, the second request received subsequent to the second evaluating; and referencing the new results in response to the second request.

In Example 23, the subject matter of Example 22 optionally includes the operations further comprising: receiving input from a user, the input defining the first validation criteria; storing the first validation criteria in a validation criteria data store; identifying, based on the first request, a first user; searching, based on the first user, the validation criteria data store; and identifying, based on the searching, the first validation criteria.

In Example 24, the subject matter of Example 23 optionally includes the operations further comprising: second searching, based on a second user, the validation criteria data store; and identifying, based on the second searching, a second validation criteria.

In Example 25, the subject matter of any one or more of Examples 23-24 optionally include wherein the input defining the first validation criteria associates a first user or group with the first validation criteria, and associates a second validation criteria with a second user or group, the first validation criteria defining first evaluations of validation results of a build of the plurality of builds, and the second validation criteria defining second evaluations of the validation results of the build.

In Example 26, the subject matter of Example 25 optionally includes wherein the first validation criteria references a result of a validation test and the second validation criteria excludes any reference to the validation test.

In Example 27, the subject matter of any one or more of Examples 23-26 optionally include the operations further comprising: receiving, from a second user, a second request, the second request indicating a second validation criteria; second searching, based on the second validation criteria, the validation results data store; identifying, based on the second searching, a second document responsive to the request; generating a second message indicating the identified second document; and transmitting the second message.

In Example 28, the subject matter of any one or more of Examples 21-27 optionally include the operations further comprising: determining first validation results associated with a first common identifier; second evaluating the first validation criteria against the first validation results; determining, based on the second evaluating, that the first validation results pass the first validation criteria; and identifying, based on the determining, the document, the document having a respective version associated with the first common identifier.

In Example 29, the subject matter of Example 28 optionally includes the operations further comprising: identifying second validation results associated with a second common identifier; third evaluating the first validation criteria against the second validation results; and determining, based on the third evaluating, that the second validation results do not pass the first validation criteria, wherein the determining of the first validation results is in response to the second validation results not passing the first validation criteria.

In Example 30, the subject matter of Example 29 optionally includes the operations further comprising: searching, based on the second common identifier, a validation results data store, wherein the identifying of the second validation results is based on the search; second searching, based on a time range earlier than a time associated with the second common identifier, the validation results data store; and identifying, based on the second searching, the first common identifier.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software may accordingly configure a hardware processor, for example, to constitute a particular module at one instance of time and to constitute a different module at a different instance of time.

Various embodiments are implemented fully or partially in software and/or firmware. This software and/or firmware may take the form of instructions contained in or on a non-transitory computer-readable storage medium. Those instructions may then be read and executed by one or more processors to enable performance of the operations described herein. The instructions are in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory; etc.

We claim:

1. A method comprising:
    performing a plurality of builds, each of the plurality of builds based on a different version of a document in a document repository;
    validating each of the plurality of builds, the validating including generating, for each respective build, a plurality of validation results, each of the validation results resulting from a different validation test on the respective build;
    receiving input from a user, the input defining a first validation criteria,
    storing the first validation criteria in a validation criteria data store;
    evaluating the first validation criteria against the validation results of a particular build of the plurality of builds;
    identifying, based on the evaluating, an identifier associated with the particular build;
    receiving a first request for the document;
    identifying, based on the first request, a first user;
    searching, based on the first user, the validation criteria data store;
    identifying, based on the searching, the first validation criteria;
    generating, based on the document repository and the identifier, a copy of a version of the document that is responsive to the first request;
    generating a message identifying the copy of the document; and
    transmitting the message.

2. The method of claim 1, wherein the validating of each of the plurality of builds further comprises storing, for each of the plurality of builds, validation results of the respective build in a validation results data store, the method further comprising:
    periodically identifying, from the validation results data store, new validation results of a new build, the new validation results associated with a new identifier;
    second evaluating the first validation criteria against the new validation results;
    storing new results of the second evaluating in a data store;

receiving a second request for a second document, the second request received subsequent to the second evaluating; and referencing the new results in response to the second request.

3. The method of claim 1, wherein the input defining the first validation criteria associates a first user or group with the first validation criteria, and associates a second validation criteria with a second user or group, the first validation criteria defining first evaluations of validation results of a build of the plurality of builds, and the second validation criteria defining second evaluations of the validation results of the build.

4. The method of claim 3, wherein the first validation criteria references a result of a validation test and the second validation criteria excludes any reference to the validation test.

5. The method of claim 1, further comprising:
receiving, from a second user, a second request, the second request indicating a second validation criteria;
second searching, based on the second validation criteria, a validation results data store;
identifying, based on the second searching, a second document responsive to the second request;
generating a second message indicating the identified second document; and
transmitting the second message.

6. The method of claim 1, further comprising:
determining first validation results associated with a first common identifier;
second evaluating the first validation criteria against the first validation results;
determining, based on the second evaluating, that the first validation results pass the first validation criteria; and
identifying, based on the determining, the document, the document having a respective version associated with the first common identifier.

7. The method of claim 6, further comprising:
identifying second validation results associated with a second common identifier;
third evaluating the first validation criteria against the second validation results; and
determining, based on the third evaluating, that the second validation results do not pass the first validation criteria, wherein the determining of the first validation results is in response to the second validation results not passing the first validation criteria.

8. The method of claim 7, further comprising:
searching, based on the second common identifier, a validation results data store, wherein the identifying of the second validation results is based on the search based on the second common identifier;
second searching, based on a time range earlier than a time associated with the second common identifier, the validation results data store; and
identifying, based on the second searching, the first common identifier.

9. A system comprising:
hardware processing circuitry; and
one or more hardware memories storing instructions that when executed configure the hardware processing circuitry to perform operations comprising:
performing a plurality of builds, each of the plurality of builds based on a different version of a document in a document repository;
validating each of the plurality of builds, the validating including generating, for each respective build, a plurality of validation results, each of the validation results resulting from a different validation test on the respective build;
evaluating a first validation criteria against the validation results of a particular build of the plurality of builds;
identifying, based on the evaluating, an identifier associated with the particular build;
determining first validation results associated with a first common identifier;
second evaluating the first validation criteria against the first validation results;
determining, based on the second evaluating, that the first validation results pass the first validation criteria;
identifying, based on the determining, the document, the document having a respective version associated with the first common identifier;
receiving a first request for the document;
generating, based on the document repository and the identifier, a copy of a version of the document that is responsive to the first request;
generating a message identifying the copy of the document; and
transmitting the message.

10. The system of claim 9, wherein the validating of each of the plurality of builds further comprises storing, for each of the plurality of builds, validation results of the respective build in a validation results data store, the operations further comprising:
periodically identifying, from the validation results data store, new validation results of a new build, the new validation results associated with a new identifier;
third evaluating the first validation criteria against the new validation results;
storing new results of the third evaluating in a data store;
receiving a second request for a second document, the second request received subsequent to the third evaluating; and
referencing the new results in response to the second request.

11. The system of claim 10, the operations further comprising:
receiving input from a user, the input defining the first validation criteria;
storing the first validation criteria in a validation criteria data store;
identifying, based on the first request, a first user;
searching, based on the first user, the validation criteria data store; and
identifying, based on the searching, the first validation criteria.

12. The system of claim 11, the operations further comprising:
second searching, based on a second user, the validation criteria data store; and
identifying, based on the second searching, a second validation criteria.

13. The system of claim 11, wherein the input defining the first validation criteria associates a first user or group with the first validation criteria, and associates a second validation criteria with a second user or group, the first validation criteria defining first evaluations of validation results of a build of the plurality of builds, and the second validation criteria defining second evaluations of the validation results of the build.

14. The system of claim 9, the operations further comprising:
receiving, from a second user, a second request, the second request indicating a second validation criteria;
second searching, based on the second validation criteria, a validation results data store;
identifying, based on the second searching, a second document responsive to the second request;
generating a second message indicating the identified second document; and
transmitting the second message.

15. The system of claim 9, the operations further comprising:
identifying second validation results associated with a second common identifier;
third evaluating the first validation criteria against the second validation results; and
determining, based on the third evaluating, that the second validation results do not pass the first validation criteria, wherein the determining of the first validation results is in response to the second validation results not passing the first validation criteria.

16. The system of claim 15, the operations further comprising:
searching, based on the second common identifier, a validation results data store, wherein the identifying of the second validation results is based on the search based on the second common identifier;
second searching, based on a time range earlier than a time associated with the second common identifier, the validation results data store; and
identifying, based on the second searching, the first common identifier.

17. A system comprising:
hardware processing circuitry; and
one or more hardware memories storing instructions that when executed configure the hardware processing circuitry to perform operations comprising:
performing a plurality of builds, each of the plurality of builds based on a different version of a document in a document repository;
validating each of the plurality of builds, the validating including generating, for each respective build, a plurality of validation results, each of the validation results resulting from a different validation test on the respective build;
receiving input from a user, the input defining a first validation criteria;
storing the first validation criteria in a validation criteria data store;
evaluating the first validation criteria against the validation results of a particular build of the plurality of builds;
identifying, based on the evaluating, an identifier associated with the particular build;
receiving a first request for the document;
identifying, based on the first request, a first user;
searching, based on the first user, the validation criteria data store;
identifying, based on the searching, the first validation criteria;
generating, based on the document repository and the identifier, a copy of a version of the document that is responsive to the first request;
generating a message identifying the copy of the document; and
transmitting the message.

18. A method comprising:
performing a plurality of builds, each of the plurality of builds based on a different version of a document in a document repository;
validating each of the plurality of builds, the validating including generating, for each respective build, a plurality of validation results, each of the validation results resulting from a different validation test on the respective build;
evaluating a first validation criteria against the validation results of a particular build of the plurality of builds;
identifying, based on the evaluating, an identifier associated with the particular build;
determining first validation results associated with a first common identifier;
second evaluating the first validation criteria against the first validation results;
determining, based on the second evaluating, that the first validation results pass the first validation criteria;
identifying, based on the determining, the document, the document having a respective version associated with the first common identifier;
receiving a first request for the document;
generating, based on the document repository and the identifier, a copy of a version of the document that is responsive to the first request;
generating a message identifying the copy of the document; and
transmitting the message.

* * * * *